United States Patent [19]

Ohkawara et al.

[11] Patent Number: 4,870,594

[45] Date of Patent: Sep. 26, 1989

[54] SYSTEM AND METHOD FOR SUPPORTING LAYOUT OF ASSEMBLY PARTS FOR VEHICLES

[75] Inventors: Masaru Ohkawara; Norimasa Kishi, both of Kanagawa, Japan

[73] Assignee: Nissan Motor Company, Limited, Yokohama, Japan

[21] Appl. No.: 101,309

[22] Filed: Sep. 25, 1987

[30] Foreign Application Priority Data

Sep. 25, 1986 [JP] Japan .............................. 61-226644
Oct. 13, 1986 [JP] Japan .............................. 61-241474
Oct. 17, 1986 [JP] Japan .............................. 61-246935
Oct. 17, 1986 [JP] Japan .............................. 61-246936

[51] Int. Cl.$^4$ ............................................ G06F 15/46
[52] U.S. Cl. ....................... 364/474.24; 364/474.13; 364/474.25
[58] Field of Search ........... 364/468, 469, 473, 474.01, 364/474.02, 474.13, 474.22, 474.23, 474.24, 474.25, 474.26

[56] References Cited

U.S. PATENT DOCUMENTS 4,646,247 2/1987 Otsuki ........................... 364/474.24
4,654,805 3/1987 Shoup ........................... 364/474.24
4,787,049 11/1988 Hirata et al. .................... 364/474.23

Primary Examiner—A. D. Pellinen
Assistant Examiner—Jeffrey A. Gaffin
Attorney, Agent, or Firm—Foley & Lardner, Schwartz, Jeffery, Schwaab, Mack, Blumenthal & Evans

[57] ABSTRACT

A man-machine system and method for backing up layout of assembly parts for a vehicle in which any one of assembly part positions, e.g., a recovery limit position of a clutch pedal is specified to set a temporary layout of each assembly part such as the clutch pedal, a coordinate position of each element on the temporary layout such as the recovery limit position is calculated on the basis of a basic data on the temporary layout for the calculation under at least one set condition (rule), and a value of data having a positional relationship to another assembly part such as a height difference between the clutch pedal and a brake pedal is calculated under the set condition. After the system determines whether the calculated data value having the positional relationship to the other assembly part is within an allowable range, a system user determines whether the calculated coordinate position adopts the layout. A change of the assembly parts on the layout position is reduced by increasing the number of times the system receives instructions from the system user.

19 Claims, 28 Drawing Sheets

FIG. 1

Data–d (depression limit position of a clutch pedal, [500, 90, 190])

500 → X coordinate
90 → Y coordinate
190 → Z coordinate

Data–d (recovery limit position of a clutch pedal, [ –, –, – ])

X coordinate, Y coordinate, Z coordinate values not yet determined.

Data–d (depression stroke of a clutch pedal, [145, #, 130, 150])

145 → set value of a stroke distance

\# → not determined for the calculated value of a stroke distance.

130, 150 → allowable value

FIG.2

Rule—C (Recovery limit position of a clutch pedal, [a fulcrum position of a clutch pedal lever, a length of a clutch pedal lever], 1)

A fulcrum position and length of a clutch pedal lever are variables of a recovery limit position of a clutch pedal.

Rule—C (Recovery limit position of a clutch pedal, [a depression limit position of a clutch pedal, depression stroke of a clutch pedal], 2)

A depression limit position and depression stroke of a clutch pedal are variables of a recovery limit position of a clutch pedal.

Rule (Recovery limit position of a clutch pedal, [1, 2], 1)

Rule (Recovery limit position of a clutch pedal, [1, 3], 2)

A recovery limit position of a clutch pedal be separated by its lever length from a fulcrum position of a clutch lever and be a position which is separated from the depression limit position of the clutch pedal by its depression stroke.

[1, 2], [1, 3] are serial numbers of rule—C.

[MOVEMENT RULE]

COMPONENT E

[IF]   If the component E is below the component F and a distance from the component E and component F is more than 10 dots,

[THEN]  move the component X in the lower direction by 2 dots.

FIG. 11

[ DATA ]

- Data—c (Fulcrum position of a clutch pedal lever, [500, 130, 440])
- Data—d (Depression limit position of a clutch pedal, [500, 90, 190])
- Data—d (Depression stroke of a clutch pedal, [145, calculated value, 130, 150])
- Data—d (&ength of a clutch pedal lever, [225, calculated value, 270, 290])

[ RULE ]

- Rule—c (Recovery limit position of a clutch pedal, [a fulcrum position of a clutch pedal lever, length of a clutch pedal lever], 1)
- Rule—c (Recovery limit position of a clutch pedal, [a depression limit position of a clutch pedal, depression stroke of a clutch pedal], 2)
- Rule (Recovery limit position of a clutch pedal, [1, 2], 1)

[ Coordinates indicating a recovery limit position of a clutch pedal ]

Data—d (Depression stroke of a clutch pedal, [145, 145, 130, 150])

Data—d (Length of a clutch pedal lever, [255, 255, 270, 290])

FIG. 13

Rule—c (Recovery limit position of a clutch pedal, [Recovery limit position of a brake pedal, Step difference between clutch pedal and brake pedal], 3)

FIG. 14

| Item | Setting value | Calculated value | Allowable minimum value | Allowable maximum value |
|---|---|---|---|---|
| Depression stroke of a clutch pedal | 145 | 145 | 130 | 150 |
| Lever length of a clutch pedal | 255 | 255 | 270 | 290 |
| Step difference between clutch and brake pedals | 5 | 30 | 0 | 15 |

FIG. 19

| Recovery limit position of a clutch pedal determination rule | |
|---|---|
| Rule 1 | [ Fulcrum position of a clutch pedal lever, length of a clutch pedal lever ]<br><br>[ Depression limit position of a clutch pedal, depression stroke of a clutch pedal ] |
| Rule 2 | [ Fulcrum position of a clutch pedal lever, length of a clutch pedal lever ]<br><br>[ Recovery limit position of a brake pedal, Step difference between clutch and brake pedals ] |
| Rule 3 | [ Depression limit position of a clutch pedal, depression stroke of a clutch pedal ]<br><br>[ Recovery limit position of a brake pedal, Step difference between clutch and brake pedals ] |

FIG. 21

Rule-C (Recovery limit position of a clutch pedal, [ Fulcrum position of a clutch pedal lever, length of a clutch pedal lever], 1)

Rule-C (Recovery limit position of a clutch pedal, [ Depression limit position of a clutch pedal, Depression stroke of a clutch pedal ], 2)

Rule-C (Recovery limit position of a clutch pedal, [ Floor line position, Initial height of a clutch pedal ], 3)

Rule-C (Recovery limit position of a clutch qedal, [ Recovery limit position of a brake pedal, Step difference between clutch and brake pedals ], 4)

Rule-C (Recovery limit position of a clutch pedal, [ 1, 2 ], 1)  →  Rule 1

Rule-C (Recovery limit position of a clutch pedal, [ 1, 4 ], 2)  →  Rule 2

Rule-C (Recovery limit position of a clutch pedal, [ 1, 3 ], 5)  →  Rule 5

FIG.23

| Applicable rule | Position | Position Difference | | | | |
|---|---|---|---|---|---|---|
| | Recovery limit pos. of clutch pedal | Name | Stroke | Lever length | Step difference | Initial height |
| | | | (135～150) | (240～260) | (0～15) | (240～260) |
| Rule 1 | (500, 245, 223) | | 145 | 255 | -30- | 245 |
| Rule 2 | (500, 260, 240) | | -180- | 255 | 10 | -262- |
| Rule 5 | (500, 245, 223) | | 145 | 255 | -30- | 245 |
| | | | | | | |

Select rule number      : Select number _____

SYSTEM AND METHOD FOR SUPPORTING LAYOUT OF ASSEMBLY PARTS FOR VEHICLES

BACKGROUND OF THE INVENTION

The present invention relates to a system and method used to support vehicle layouts of assembly parts comprising vehicles using a man-machine interface.

To complete positional arrangements on the assembly parts efficiently and in a short time, an automatic design program such as a CAD (Computer Aided Design) using computer systems has been carried out. Such kinds of systems have been utilized for the layout of the assembly parts particularly determining a driving posture such as a clutch pedal, brake pedal, and so on.

For example, when determining a recovery limit position of the clutch pedal (a returning position of the clutch pedal after the clutch pedal has been depressed) during the layout of the clutch pedal, a basic data of the position layout shown in FIG. 1 and a rule (condition) data shown in FIG. 2 are prepared.

Supplemental explanations are attached to a right side of data as shown in FIGS. 1 and 2. The clutch pedal is operated within a Y-Z coordinate plane as appreciated from FIG. 3.

FIG. 4 shows a processing flowchart executed in a proposed layout supporting system.

When the basic data is inputted in a step 100, the system determines whether any position at which the calculation of layout thereon is not carried out is present in a step 102.

As appreciated from FIG. 1 (Data-d), the recovery limit position of the clutch pedal (X, Y, and Z coordinate values) is not calculated (positive acknowledgement in the step 102). The name of the recovery limit position of the clutch pedal (no calculated position) is displayed as a position to be calculated together with other names for non-calculation positions in a step 104.

After the name of the position to be calculated for the parts layout from among these displayed names (for example, the recovery limit position of the clutch pedal) is confirmed and its confirmation input operation is carried out (positive acknowledgement in a step 106), a set condition (refer to FIG. 2) on the recovery limit position of the clutch pedal such that the recovery limit position thereof is separated by a depression stroke from a depression limit position thereof is displayed together with other set conditions on the other positions to be still calculated in a step 108.

When, e.g., the set condition on the recovery limit position of the clutch pedal from among these displayed conditions is selected, the position to be calculated is specified (positive acknowledgement in a step 110), the position calculation using input data on the recovery limit position under the selected set condition is carried out (in a step 112). Thus, the recovery limit position of the clutch pedal is determined.

Upon end confirmation of the calculation carried out in the step 112 (positive acknowledgement in a step 114), position calculations for the other positions to be calculated are repeated (from the negative acknowledgement in the step 116 to the return to the step 102).

Upon end completion of calculation for all positions (positive acknowledgement in the step 116), a positional difference between each calculation position and one of the other positions having a relationship to the one calculated position in the assembly parts layout (for example, a step (height) difference between the clutch pedal and brake pedal) are all calculated in a step 118.

Thereafter, each layout position of the clutch pedal is finally determined upon a processing for a layout modification on the basis of the step difference (step 120).

In the processing routine shown in FIG. 4, the positions of the other assembly parts can be determined prior to a selection of the set condition to be applied to the present position calculation if in the step 110, the set condition to be applied to the present position calculation is not selected (a step 122). If the position calculation is not possible, another rule (set condition) can be selected in a step 124.

Since, however, in the previously proposed system described above, the positional difference between each position and one of the other positions having the relationship to the one position in the layout of the assembly parts is derived after all of the positions of the temporary layout have been calculated (in step 100 to 116), the derived positional difference is often deviated from an allowable range determined from a human engineering viewpoint, a remarkable change in the layout is involved. Consequently, an efficiency of positional layout for the assembly parts is reduced.

The same problem as described above occurs since the position calculation is carried out in the step 112 under the set condition which is arbitrarily selected from applicable set conditions (rules) for which all necessary data are completely prepared and, therefore, any condition required for the position at which the positional difference such as between the clutch pedal and brake pedal becomes favorable for the request by a system user and becomes in the allowable range is often not selected.

Next, another previously proposed layout design supporting system will be described below.

FIG. 5 shows a functional block diagram of another proposed assembly parts layout backing up system.

Various kinds of information on, e.g., layout of a vehicle are displayed on a CRT (Cathode Ray Tube) comprising, e.g., a graphic screen (not shown). A user selects, e.g., a layout of assembly components in the vicinity of a driver's seat from among the various kinds of displayed information, depresses a corresponding key on an input device keyboard (not shown), and inputs, e.g., codes of components such as eyepoint of the driver, roof, steering wheel, accelerator pedal into the system shown in FIG. 5. The codes of the inputted components are stored in a memory A 23. A memory B 21 previously stores each of the profiles of such components as described above as a standard design of the layout of the vehicle in a state where each component is temporarily arranged in a region of the graphic screen of the CRT (temporary layout). A retriever unit 27 reads the temporary layout information corresponding to the user inputted component from the memory B 23 and detects whether the temporarily arranged component can be applied to a user's design specification, so called, layout requirement. If the detected result indicates that all components satisfy the layout requirement, the state of the temporary layout is displayed on the CRT and the layout is completed.

On the other hand, if any one of the components that does not satisfy the layout requirement is detected, the retriever unit 27 displays the state of temporary layout on the CRT and outputs a calculation command signal to a calculator unit 29. Upon receipt of the calculation command signal, the calculator unit 29 carries out a calculation of the layout if the component that does not satisfy the layout requirement is applied to a movement rule shown in FIG. 6. The calculator unit 29 does not carry out the calculation, i.e., the layout movement of that component is impossible if that component is not applied thereto. Consequently, the layout design cannot be carried out.

The movement rules shown in FIG. 6 will be described below. If for the component (accelerator pedal) E, the accelerator pedal is, e.g., arranged at a lower position with respect to, e.g., a Y coordinate of the other component (roof) F in an IF statement and a distance between the accelerator pedal and roof is equal to or more than 10 dots (pixels), the accelerator pedal indicated in a THEN statement is moved in the downward direction by 2 dots with respect to the Y coordinate.

The calculator unit 29 calculates and moves the component which does not satisfy the layout requirement on the basis of the corresponding movement rule and stores the state of the temporary layout of the component into the memory B 23.

The layout supporting system is repeatedly carried out in the way described above.

As described above, the proposed design layout supporting system carries out the design layout supporting, with the temporary layout previously stored moved in such a direction as to satisfy the layout requirement on the basis of the corresponding movement rule.

However, since, in such a component layout backing up system, the temporary layout is previously determined as the standard design, it becomes necessary to store many movement rules in the memory C 25 as the layout design becomes complex. In addition, if the layout change occurs, the user needs to calculate the distance and angle between correlated components so as to achieve the temporary layout in order to set these components on arbitrary coordinates. Therefore, such operations as to complete the layout design from the temporary layout are troublesome and improvements for such operations have been demanded.

SUMMARY OF THE INVENTION

It is, therefore, an object of the present invention to provide the improved system and method for supporting layout of the assembly parts (components).

It is another object of the present invention to provide efficient system and method for supporting layout of the assembly parts which meet user's demand through the increase of number of times the user's selections.

It is still another object of the present invention to provide the system and method for supporting layout which is capable of extending a selection range of position calculation conditions and is capable of utilizing calculations obtained under an optimum condition.

It is yet still another object of the present invention to provide the system and method for supporting layout of the assembly parts in which an applicable set condition under which a most favorable positional difference between correlated assembly can be derived from a human engineering point of view or according to a request from the system user is selected so that the layout can always be carried out efficiently.

The above-described objects can be achieved by providing a system for supporting layout of assembly parts for a product, comprising: (a) first unit for specifying any one of positions of elements to be derived, the elements defining a layout position of each assembly part; (b) second unit for deriving the specified position of the dual elements on the layout on the basis of a basic data on the layout under at least one set condition and deriving a data based on a positional requirement to another element of one of the other assembly parts under the set conditions; (c) third unit for determining whether the data based on the positional requirement is within an allowable range; (d) fourth unit for displaying the result of determination in the third unit to select or discard the layout position of the specified position of the element in accordance with an instruction by a system user until all positions of the elements are specified and derived by the first and second unit and selected by the user through the fourth unit; and (e) fifth unit for changing the layout position of the corresponding element which is deviated from the allowable range when all positions of the elements are specified and derived by the first and second unit and selected by the user through the fourth unit.

The above-described objects can also be achieved by providing a system for supporting layout of components for a part of a vehicle, comprising: (a) first unit for sequentially specifying any one of coordinate positions of elements to be calculated, the elements defining a layout position of each component on the part of the vehicle; (b) second unit for deriving the specified position of the element on the layout on the basis of a variable on the layout of the part of the vehicle under at least set condition for the layout and deriving a positional data on a positional relationship to another element of any one of the other assembly parts under the set condition; (c) third unit for determining whether the positional data within an allowable range; (d) fourth unit for displaying the result of determination in third unit and selecting or discarding the layout position of the specified position of the element in accordance with an instruction by a system user until all positions of the elements of each assembly part are specified and derived by the user through the fourth unit; and (e) fifth unit for changing the layout position of the corresponding position which is deviated from the allowable range and is selected by the user when all positions of the elements are specified and derived by the first and second units and selected by the user through the fourth unit.

The above-described objects can also be achieved by providing a method for supporting layout of components for a product, the method comprising the steps of: (a) specifying any one of elements positions to be derived, the elements defining a layout position of each component; (b) deriving the specified position of the individual elements on the layout on the basis of a basic layout data under at least one set condition; (c) deriving a position data based on a positional relationship to another component under the set condition; (d) determining whether a value of the position data falls within an allowable range; (e) displaying the result of determination in the step (d) for selecting or discarding the layout position on the specified position of the component in accordance with an instruction by a system user; and (f) repeating the steps of (a) to (e) until all specified positions of the components are derived and the position data values fall within the allowable range.

BRIEF DESCRIPTION OF THE DRAWINGS

FIGS. 1 and 2 are explanatory views of the contents of memory in a proposed system for supporting layout of assembly parts for vehicles.

FIGS. 11, 12 and 13 are explanatory views for explaining the contents of memory in the first preferred embodiment shown in FIGS. 7 to 10(B)

FIG. 14 is an explanatory view for explaining an example of contents of display in the first preferred embodiment shown in FIGS. 7 to 10(B).

FIG. 19 is an explanatory view of an example of display in the second preferred embodiment.

FIG. 21 is an explanatory view of the contents of a memory in the third preferred embodiment.

FIG. 23 an explanatory view of an example of displayed contents in the third preferred embodiment.

DETAILED DESCRIPTION OF THE PREFERRED EMBODIMENTS

Reference will hereinafter be made to the drawings in order to facilitate understanding of the present invention.

The two proposed vehicle assembly parts layout supporting systems have been described in the background of the invention with reference to FIGS. 1 to 6.

FIRST PREFERRED EMBODIMENT

Figure 7:
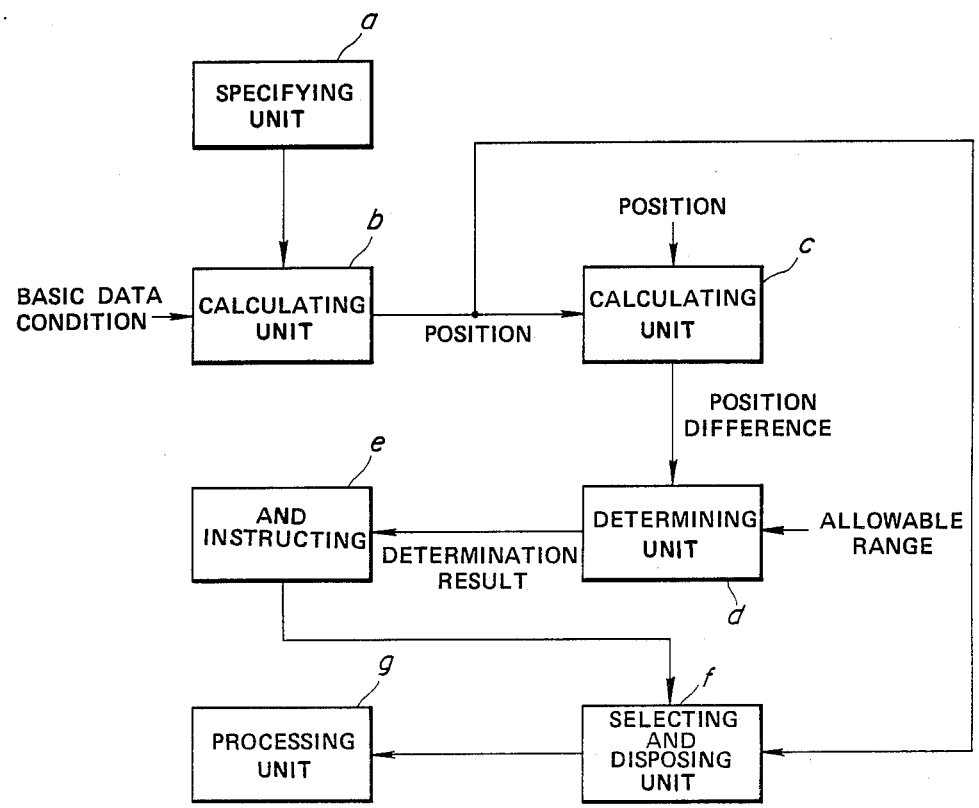
FIG. 7 is a functional block diagram of a system for backing up layout of assembly parts for vehicles for explaining a general concept of a first preferred embodiment.

FIG. 7 shows a general concept of a vehicle assembly parts layout supporting system applicable to a design of a vehicle body in a first preferred embodiment.

In FIG. 7, specifying unit denoted by a specifies any one of positions of an assembly part to be calculated. In addition, calculating means denoted by b calculates a specified position under a set condition on the basis of a basic data of the layout. Furthermore, calculating unit denoted by c derives a positional difference between the calculated position and another position having a relationship in arrangement of assembly parts to the calculated position. Determining unit denoted by d determines whether the position difference is deviated from an allowable range. The result of determination is informed to a system user through informing and instructing unit denoted by e. Selecting and disposing unit denoted by f selects or disposes the calculated position in accordance with an instruction from the system user through the informing and instructing unit e. When all calculated position values are derived, processing unit denoted by g carries out a processing of layout change for each of the calculated positions.

In the first preferred embodiment, the position difference between the calculated position and the other correlated position is derived whenever the specified position is calculated and then the result of determination whether the calculated position difference is in the allowable range is informed to the system user.

Then, the calculated position is selected or discarded by the system user on the basis of the result of determination. The processing of layout change is carried out when all calculated values are derived by repeating the above-described procedure.

Figure 8:
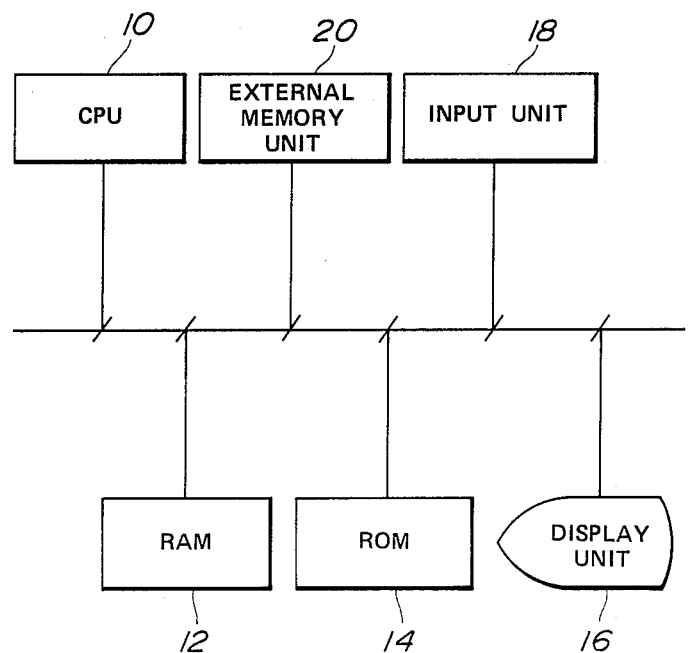
FIG. 8 is a specific circuit block diagram of the assembly parts layout supporting system in the first preferred embodiment.

FIG. 8 shows a hardware block diagram of the first preferred embodiment.

The layout supporting system includes A CPU (Central Processing Unit) 10, a RAM (Random Access Memory) 12, a ROM (Read Only Memory) 14, a display unit (Cathode Ray Tube: CRT) 16, an input unit 18, and an external memory unit 20 (for example, a magnetic disc driver and magnetic disc storage unit).

FIGS. 9(A) to 10(B) show processing flowcharts executed by the CPU 10. The flowcharts shown in FIGS. 9(A) to 10(B) are executed in parallel to each other.

FIG. 11 shows stored data for the position calculation under one of the set condition (rules) shown in the same drawing.

It is noted that $P_x$ in steps 102 and 104 denotes a position which can be calculated but is not yet determined and $P_D$ in a step 106 denotes a position which is not yet determined and whose calculation is desired.

Figure 3:
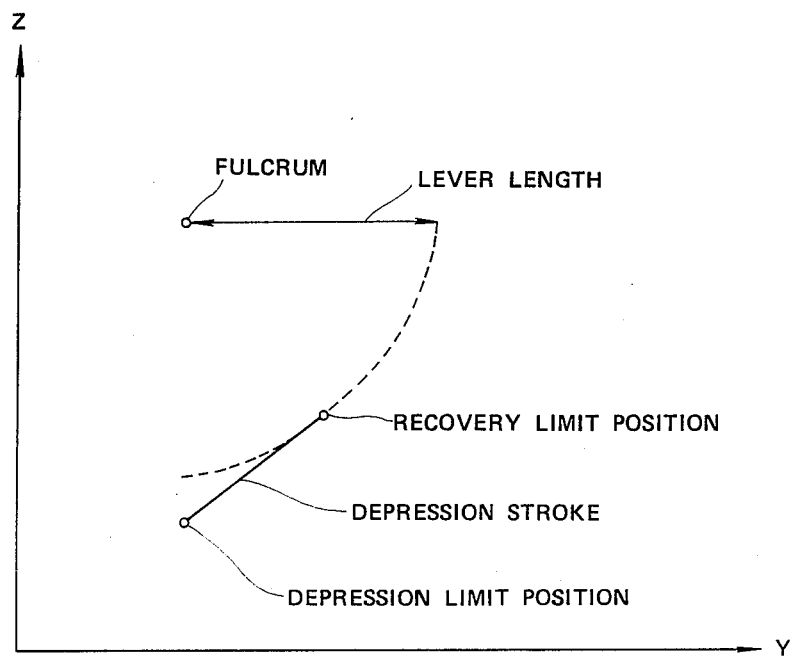
FIG. 3 is a graph representing a Y-Z coordinate plane for explaining the contents of memory in FIGS. 1 and 2.
Figure 4:
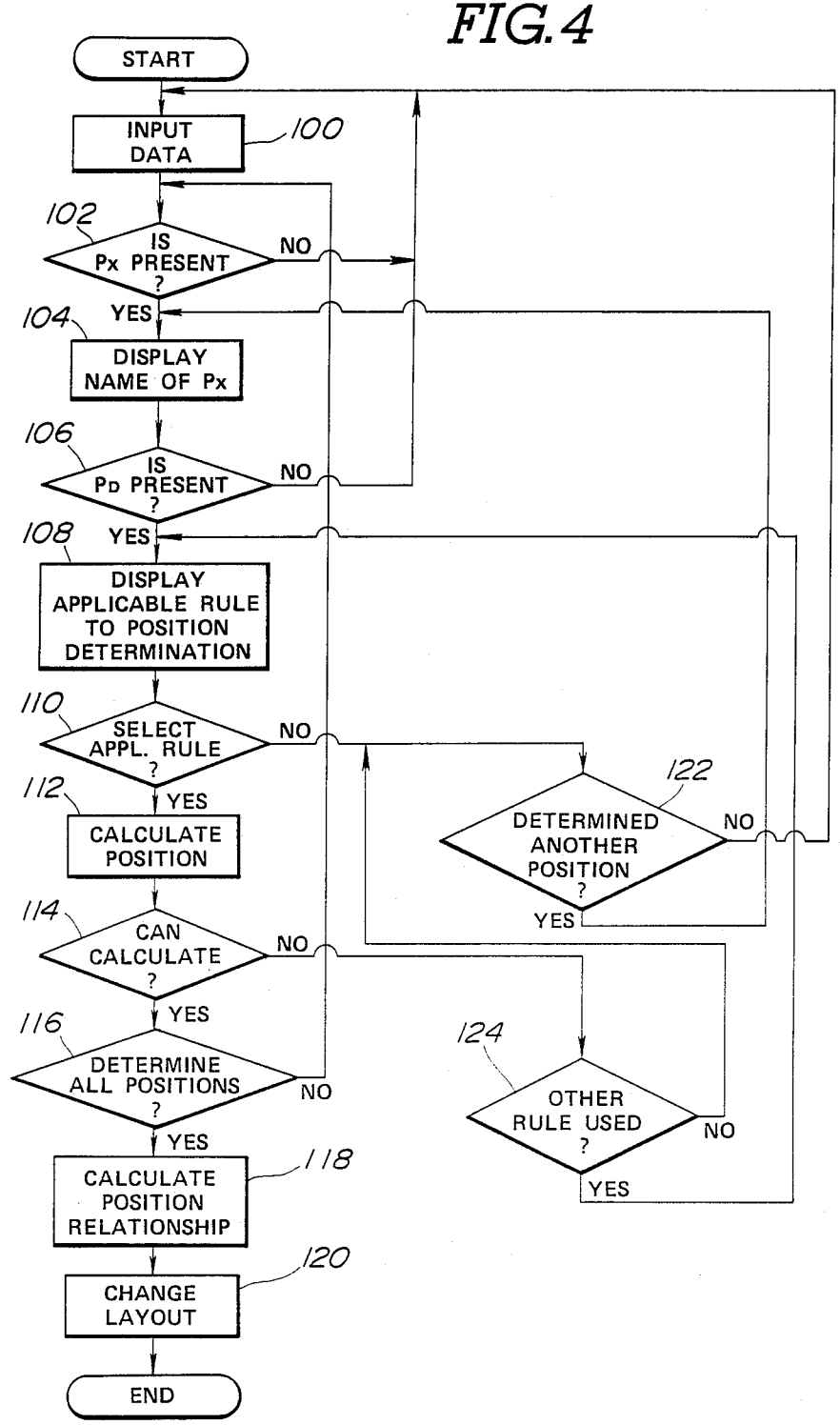
FIG. 4 is a processing flowchart for explaining an operation of the proposed system shown in FIGS. 1 to 3.
Figure 5:
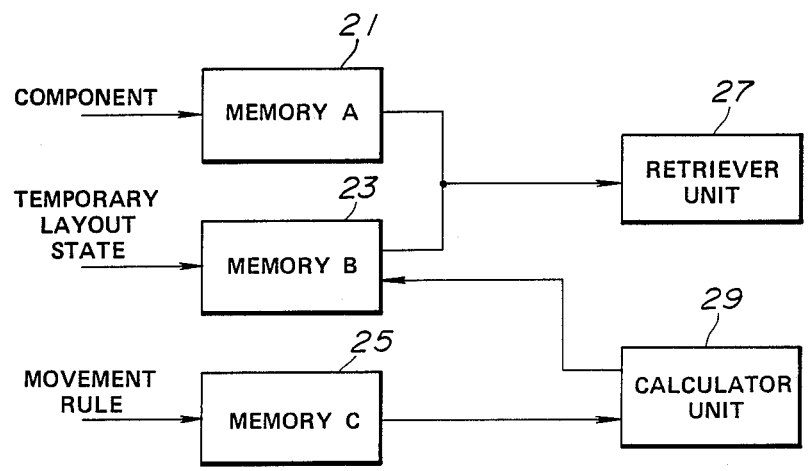
FIG. 5 is a functional block diagram of another proposed system for support layout of assembly parts for vehicles.

In the steps 100 to 114 of FIG. 9(A) which are substantially the same as those shown in FIG. 4, the position calculation is carried out under the set condition (rule) shown in FIG. 11 so that x, y, and z coordinates (x, y, z)=(500, 245, 223) shown in FIG. 11 and representing a recovery limit position of a clutch pedal are derived. The definition of the recovery limit position of the clutch pedal is already described with reference to FIG. 3.

In the above described steps, set values indicating the position difference from among the data used in the steps (a depression stroke of a clutch pedal; a lever length of the clutch pedal; refer to FIG. 11) becomes equal to the calculated value. Therefore, in a step 130 of FIG. 7(A), the set value is stored as the calculated value without change as shown in FIG. 12.

Next, when the CPU 10 confirms that a step (height) difference between the clutch and brake pedals should be calculated (positive acknowledgement in a step 132) and that its calculation is possible (positive acknowledgement in a step 134), the CPU 10 calculates the step difference between the clutch and brake pedals in the same way as the previously proposed system shown in FIGS. 1 to 4 under the set condition (rule) shown in FIG. 13 and stores the calculated step difference in the RAM 12 in a step 118.

Figure 10A:
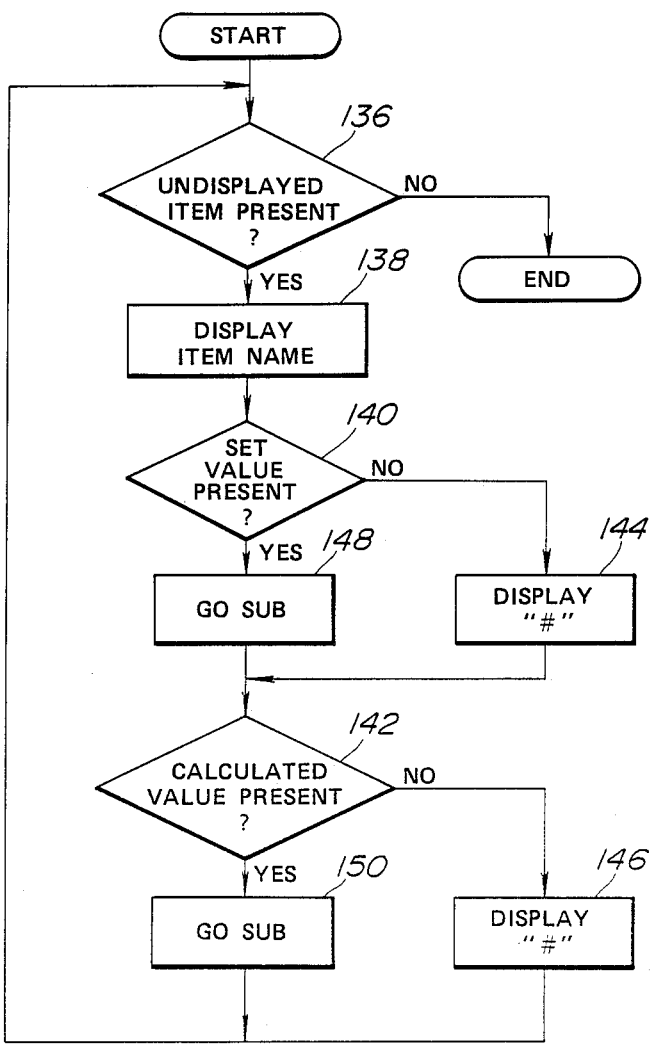
FIGS. 10(A) and 10(B) are other processing flowcharts for explaining the operation of the first preferred embodiment shown in FIGS. 7 and 8.

Upon the storage of the calculated step difference, the parallel processing routine shown in FIG. 10(A) is started. In a step 136 of the subroutine in FIG. 10(A) the CPU 10 determines whether an item of the step difference between the clutch and brake pedals is not yet displayed. If yes (not yet displayed) in the step 136, the routine then goes to a step 138 in which a name of the item (in this case, the step difference) is displayed. The CPU 10 then determines whether both set value and calculated value of the displayed item (step difference) have already stored in the RAM 12 in steps 140 and 142.

If neither set value nor calculated value is stored or either of them is not stored, the CPU 10 displays a symbol "#" on the CRT 16 in steps 144 and 146.

Figure 10B:
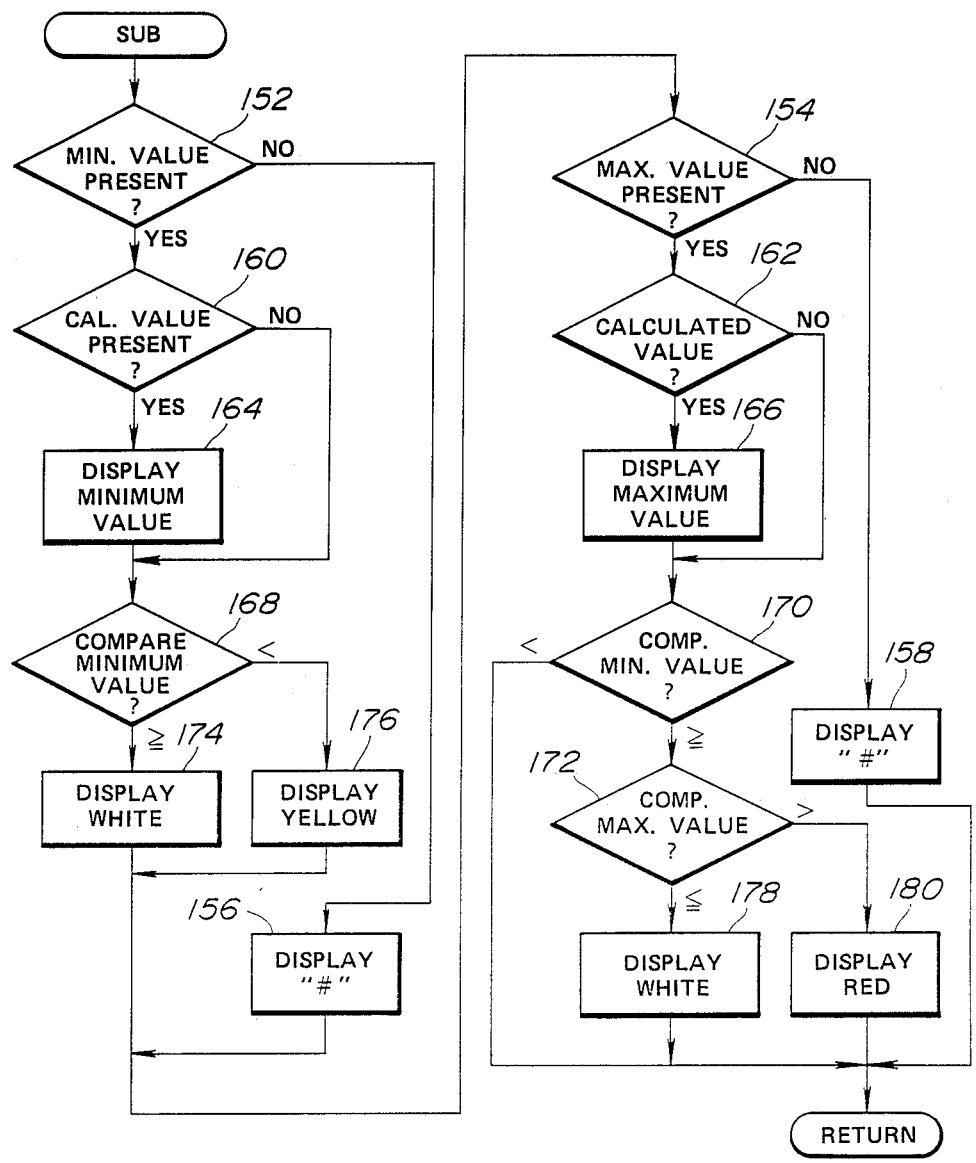

On the other hand, if both of them or either of them is displayed in the steps 140 and 150, the routine goes to a sub routine shown in FIG. 10(B).

In the processing subroutine shown in FIG. 10(B), the CPU 10 confirms whether either or both of minimum value and maximum value of the pedal step difference determined from a human engineering point of view are present in steps 152 and 154. If either or both of the maximum and minimum values is not present in the steps 152 and 154, the CPU 10 displays the symbol(s) "#" on the CRT 16 in steps 156 and 158. If either or both of the minimum and maximum values are present (positive acknowledgement) in the steps 152 and 154, either or both of the allowable minimum and maximum values are displayed on the CRT 16 in steps 164 and 166 provided that the CPU 10 confirms that the calculated value of the step difference has been derived in steps 160 and 162.

Then, in steps 168, 170 and 172, the CPU 10 compares these allowable minimum value and allowable maximum value with the set value and calculated value. If both of the set and calculated values of the step difference of both pedals are below the allowable minimum value, the CPU 10 displays them on the CRT 16 in yellow in a step 176. If they exceed the allowable maximum value, the CPU 10 displays them on the CRT 16 in red in a step 180. If they fall within a range between the allowable minimum and maximum values, the CPU 10 displays them on the CRT 16 in white in steps 174 and 178.

In visual confirmation of different colored contents of display by the system user, the user determines whether the position calculated value (recovery limit position of the clutch pedal) which has serves as the basis for the pedal step difference should be adopted. At this time, the routine returns to a step 182 of FIG. 9(B) to wait for and confirm his determination result of adopting the position calculated value.

In detail, when the calculated pedal step difference is below the allowable minimum value and displayed on the CRT 16 in yellow or when it exceeds the allowable maximum value and is displayed thereon in red, the system user determines that the recovery limit position of the clutch pedal which has served as the basis for the calculation of, e.g., the step difference is not adopted.

When such an input information through the input unit 18 as described above (no adoption) is carried out (negative acknowledgement in the step 182), its calculation position (the recovery limit position of the clutch pedal) is erased in a step 184. Then, the routine goes to a step 124 in which the CPU 10 determines whether another rule (set condition) should be adopted. If no other set condition (rule) is adopted (NO) in the step 124, the routine goes to a step 124 in which the CPU 10 determines whether another position should be calculated prior to the present calculation.

On the other hand, if the pedal step difference is displayed in white on the CRT 16 and is within the allowable range between the maximum and minimum values and the system user determines that the recovery limit position is adopted as the temporary layout position, the same processing for the next position to be calculated is repeated in the way described above.

Consequently, while the selections or disposition of the calculated positions by the system user are sequentially carried out in the step 182, the parallel routine shown in FIG. 10(A) and the subroutine shown in FIG. 10(B) is executed and, for example, a displayed image on each item of position calculation shown in FIG. 14 appears on a screen of the CRT 16.

Figure 9:
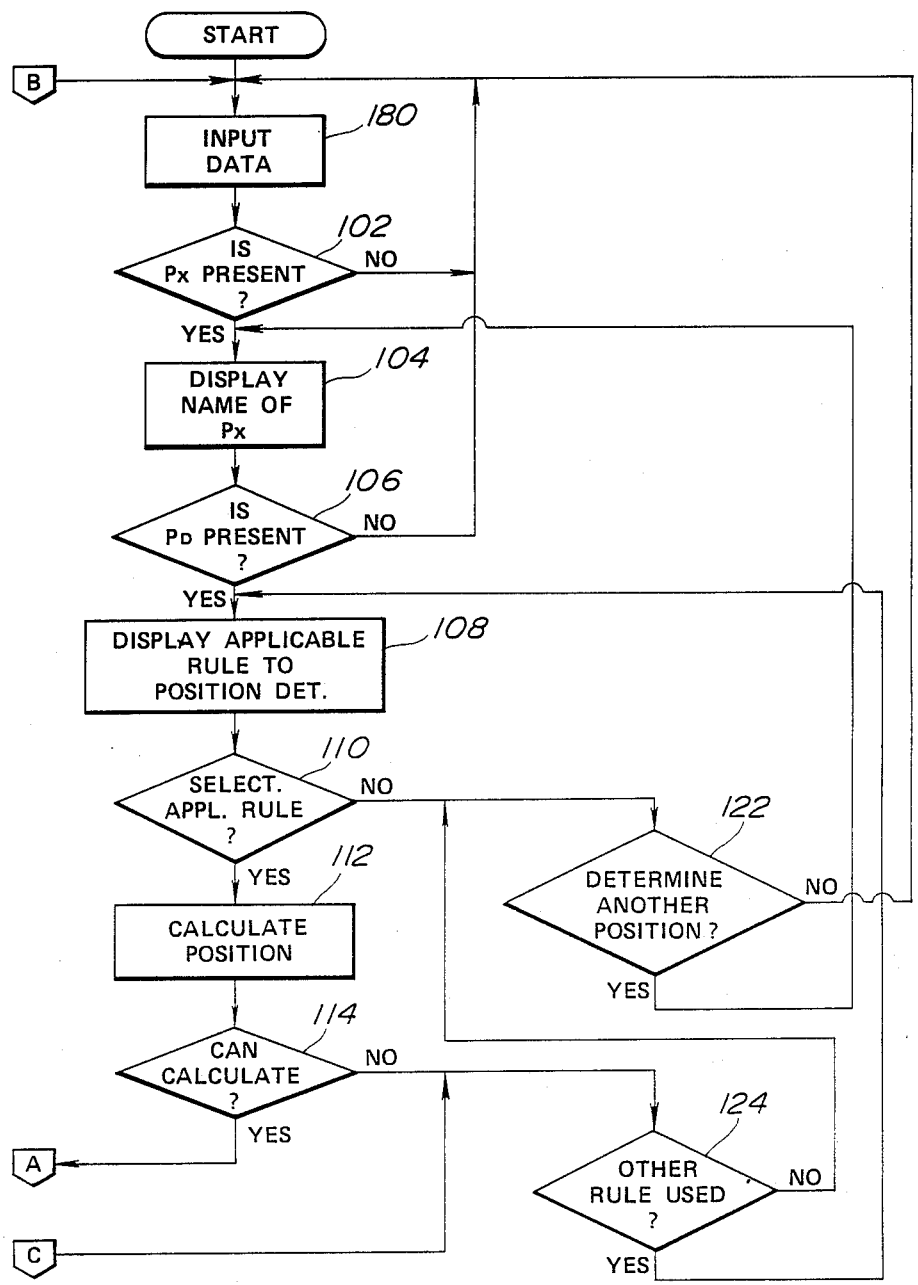
FIGS. 9(A) and 9(B) are integrally a processing flowchart for explaining an operation of the first preferred embodiment shown in FIGS. 7 and 8.
Figure 9:
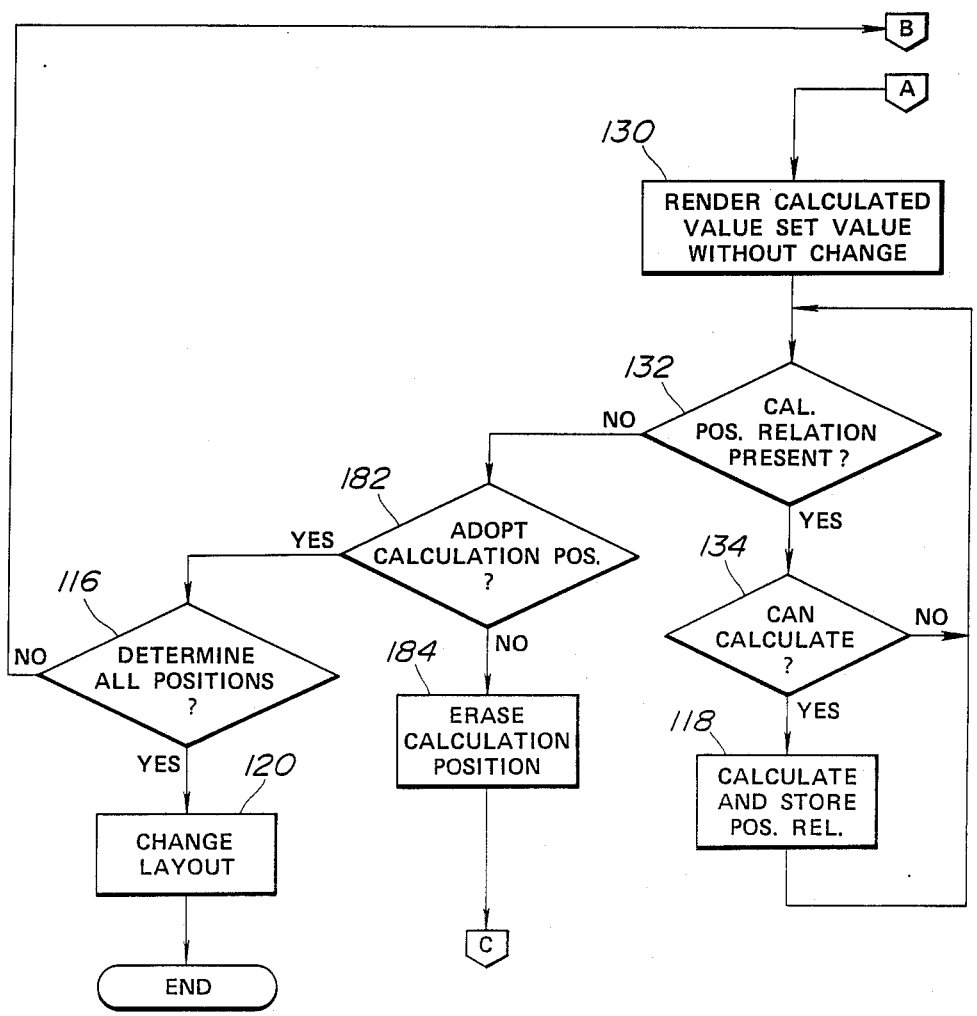

Thereafter, the repetition of the above-described series of processings shown in FIGS. 9(A) to 10(B) causes all positions to be determined (positive acknowledgement in a step 116 of FIG. 9(B)). Then, the CPU 10 carries out the processing of layout change for those positions within the allowable range in a step 120.

As described above, in the first preferred embodiment, the result of determination on whether the positional difference between the specified position whose value is calculated and other position having the relationship in the positional arrangement of the assembled parts to the calculated position falls within the allowable range determined from the human engineering point of view is displayed on the CRT 16 whenever the calculated value of the specified position is derived. The system user can eliminate through the contents of the determination result the temporary layout position whose positional difference is out of the allowable range. Hence, the layout change processing (step 120) for only the temporary layout position falling within the allowable range can be carried out. Therefore, a remarkable change in the layout position can be avoided. Consequently, the detailed design for the vehicle can effectively be carried out in a short period of time.

In addition, in the first preferred embodiment, evaluation results for the positional difference are identified in different colors as described above. Therefore, in the step 184 of FIG. 9(B), the system user can eliminate only the calculated position requiring the remarkable change in layout without mistake.

Figure 15A:
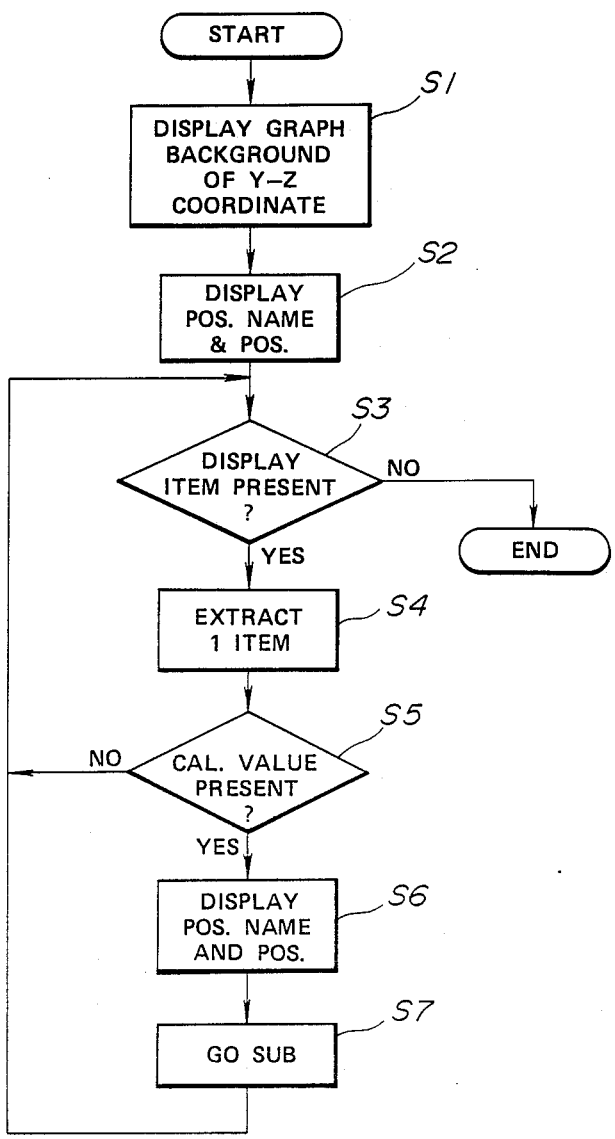
FIGS. 15(A) and 15(B) are integrally a processing flowchart for explaining another display processing in the first preferred embodiment.
Figure 15B:
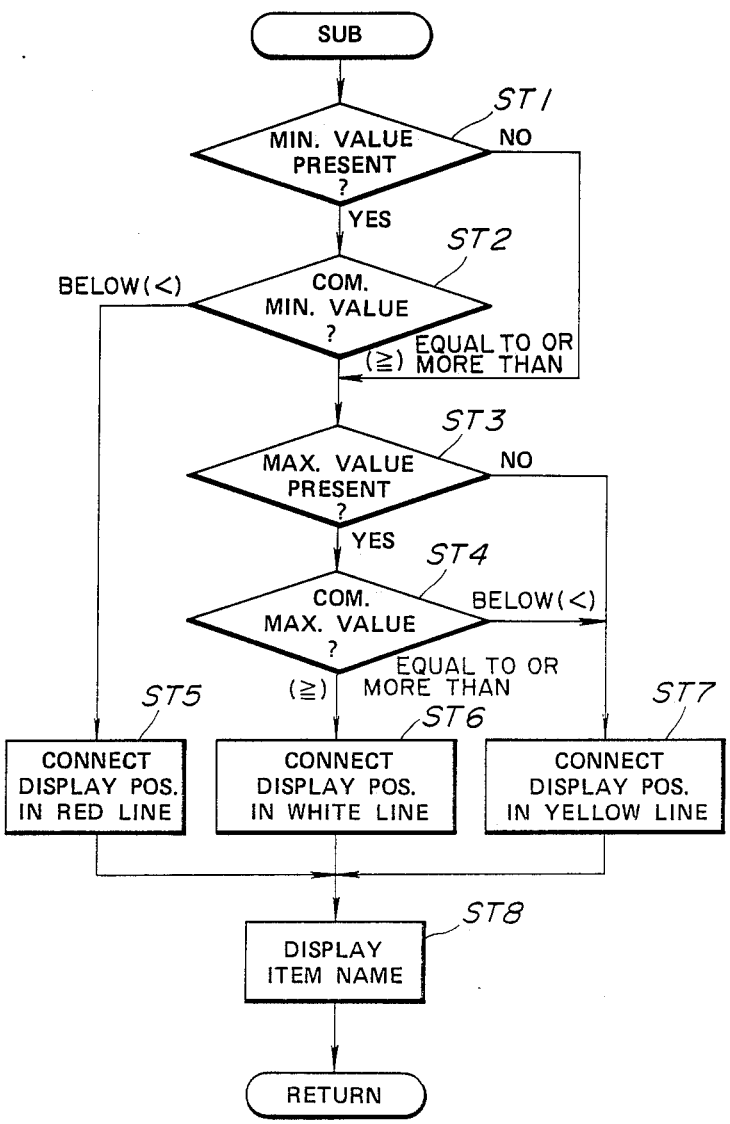
Figure 16:
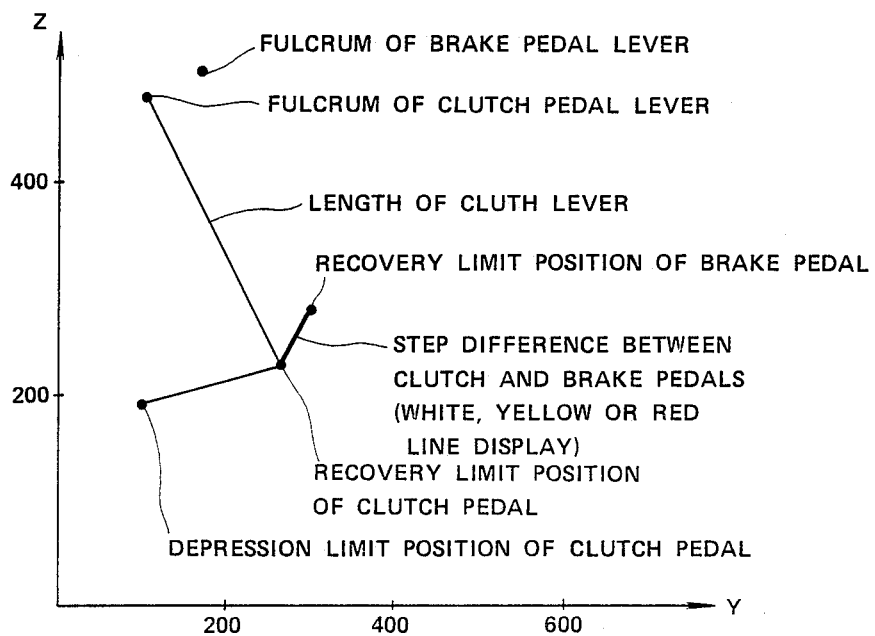
FIG. 16 is a graph representing another example of display in the first preferred embodiment.

It is noted that although, in the first preferred embodiment, the display of each item of the individual positions in the format shown in FIG. 14 is carried out, a graphical display thereof as shown in FIG. 16 may alternatively be carried out if other processing routines from steps S1 to S7 of FIG. 15(A) and from steps ST1 to ST8 of FIG. 15(B) are executed in place of FIGS. 10(A) and 10(B).

In this case, a portion of the step (height) difference between the clutch and brake pedals is displayed on the CRT 16 in a line segment as denoted by a bold solid line shown in FIG. 16 and the line segment portion is classified in different (white, yellow, or red) colors to identify whether the step difference is within the allowable range in the same way as described above.

SECOND PREFERRED EMBODIMENTS

Figure 17:
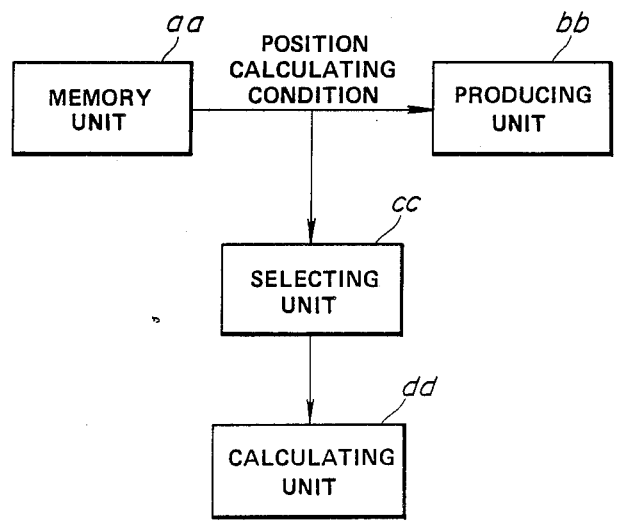
FIG. 17 is a functional block diagram for explaining a general, concept of the layout backing up system in a second preferred embodiment.

FIG. 17 shows a general concept of the assembly parts layout supporting system in a second preferred embodiment.

Memory unit denoted by aa stores a plurality of position calculation conditions on each position to be calculated on predetermined vehicle body assembly parts (components).

Producing unit denoted by bb produces to the system user all of position calculation conditions stored for the specified one of the positions to be calculated. Selecting unit denoted by cc selects any of the stored position calculation conditions for the user specified position in accordance with an instruction of the system user.

Then the specified position to be calculated is derived by unit of calculating means denoted by dd under the selected position calculation condition.

In the second preferred embodiment, all of the position calculation conditions stored for the specified position are produced to the system user.

The calculation of position is carried out under the selected any calculation condition.

It is noted that if a condition which is impossible to apply to the position calculation is selected, the system can carry out a necessary data input or correction of a data base to cope with such a situation.

The circuit block diagram of the second preferred embodiment is the same as that in the first preferred embodiment shown in FIG. 8.

Figure 18A:
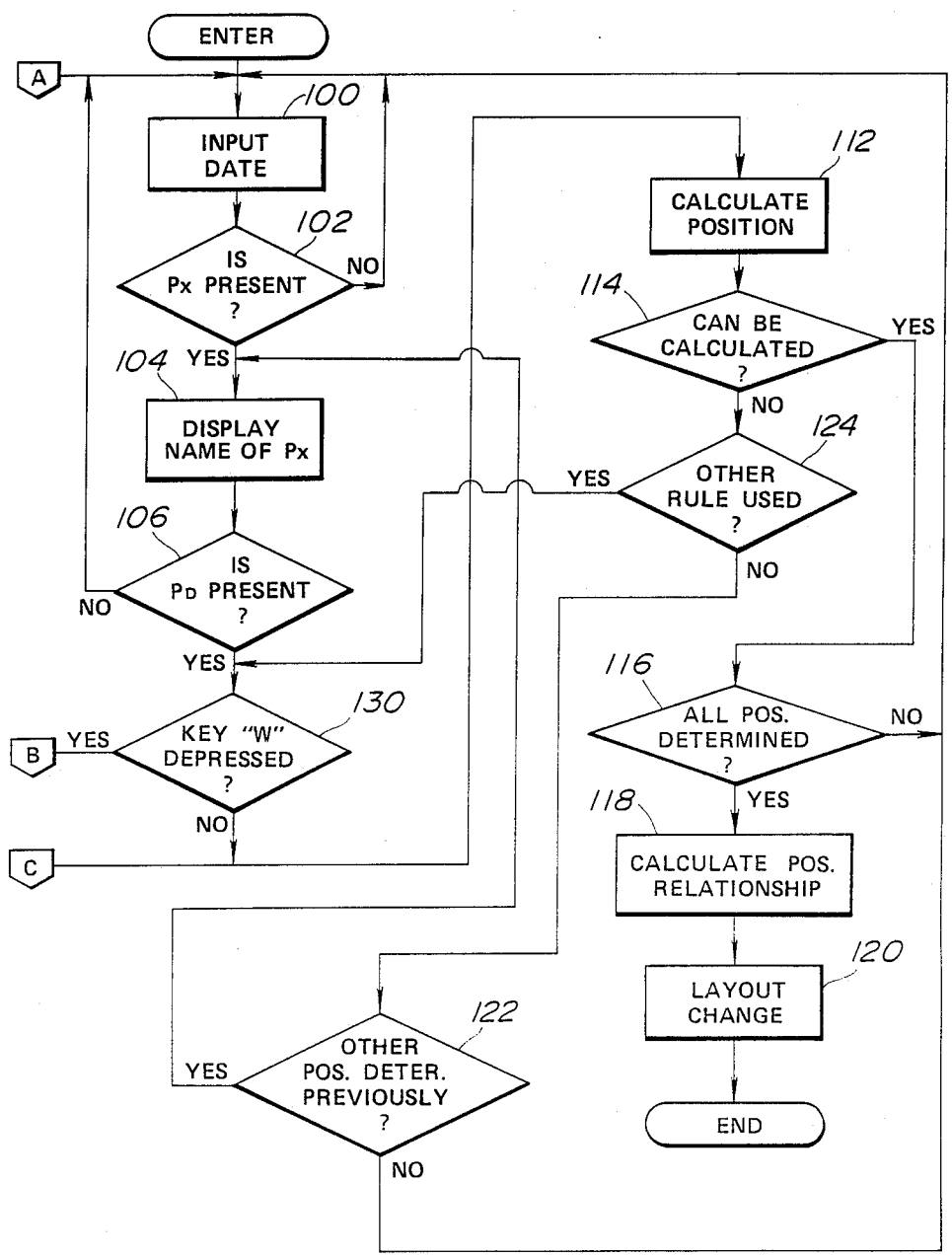
FIGS. 18(A) and 18(B) are integrally a processing flowchart for explaining the operation of a second preferred embodiment.
Figure 18:
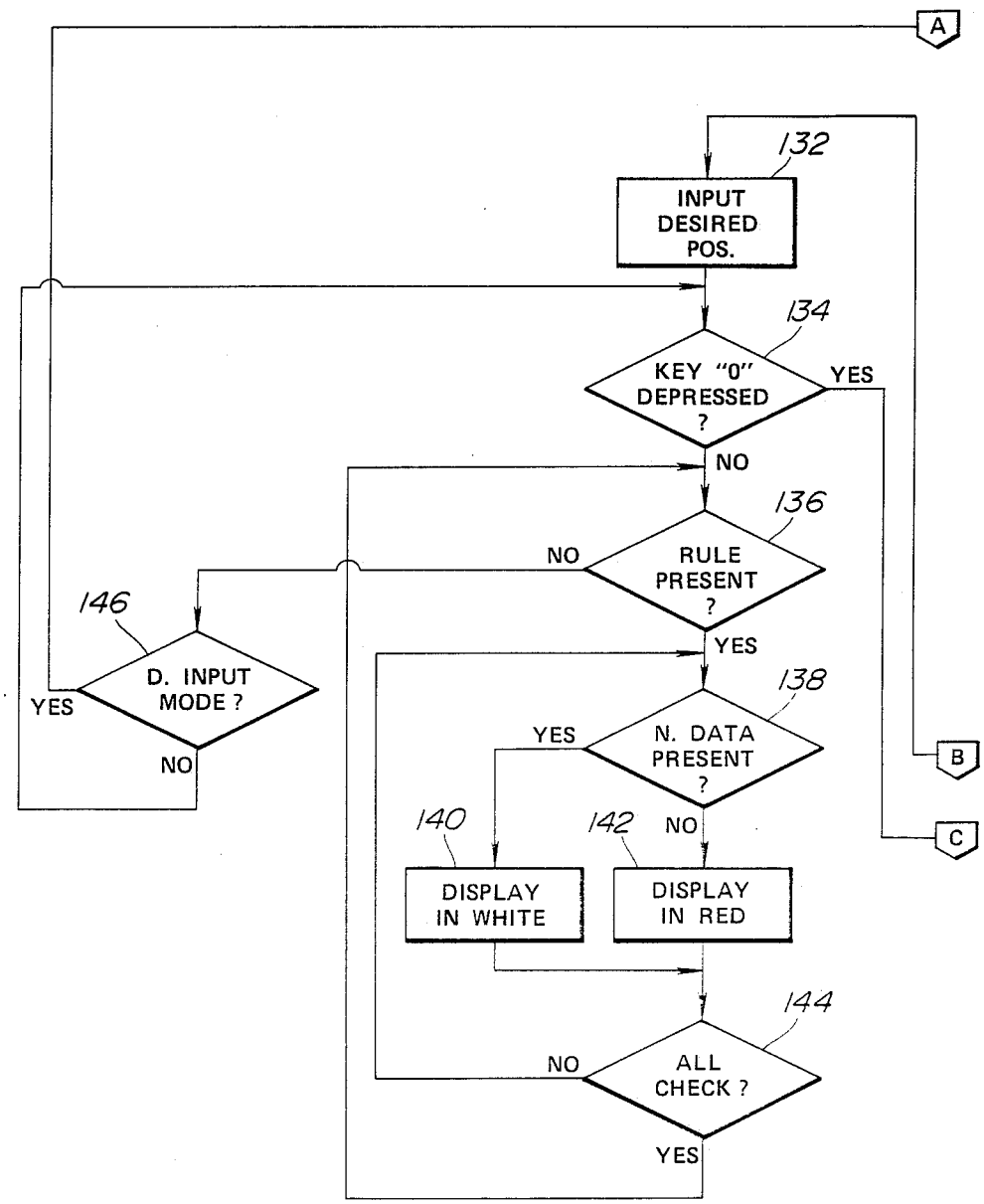

FIGS. 18(A) and 18(B) shows integrally a processing flowchart executed by the CPU 10 in the second preferred embodiment.

It is noted that the same step numbers shown in FIGS. 18(A) and 18(B) designate corresponding contents of processing routine shown in FIGS. 9(A) and 9(B).

In FIG. 18(A), after the CPU 10 confirms the presence of the position to be calculated (positive acknowledgement of the step 106), the CPU 10 determines whether a predetermined key (for example, "W") of the input unit 18 has been depressed.

If Yes ("W" key has been depressed) in the step 130, the CPU 10 confirms a specification of a position for which the position calculation is requested in a step 132.

The CPU 10 then determines whether all calculation conditions (rules) have already been displayed on the CRT 16 in a step 136 provided that an end key (for example, "0") has not been operated (negative acknowledgement in a step 134).

When all position calculation positions are not displayed (positive acknowledgement (YES) in the step 136), the CPU 10 reads any of the undisplayed position calculation conditions and determines whether a necessary numerical data is set in the read position calculation condition in a step 138. If the necessary numerical data is set and the read condition is applicable without change (positive acknowledgement in the step 138), the contents of the read condition is displayed in white on the CRT 16 in a step 140. If no necessary numerical data is set, only a part of the image to display the unset numerical data is displayed on a corresponding portion of the image on the CRT 16 in red in a step 142.

Thereafter, the same series of processings on all conditions is repeated (the steps 138, 140 and 142) upon confirmation of displays of all calculation conditions in a step 144. Consequently, each calculation condition described above is sequentially line displayed on the screen of the CRT 16, e.g., as shown in FIG. 19.

In FIG. 19, numerical values representing step (height) differences between the clutch and brake pedals in second and third conditions (Rule 2 and Rule 3) are not yet set, these numerical data portions are displayed in red. The red displayed data mean that the second and third conditions are not directly applied to the corresponding calculation. In addition, in FIG. 19, all data in a first condition (Rule 1) are displayed in white and this demonstrates that the first condition can directly be applied thereto.

Then, when all calculation conditions are displayed on the CRT 16 (positive acknowledgement in a step 144, negative acknowledgement in the step 136), the system user selects the calculation condition to be applied to the position calculation (carried out in the step 112).

If the user selects the condition displayed in red, the CPU 10 commands to return to the input mode (step 100) in the step 146 (positive acknowledgement). In the step 100, the numerical data required for the red-displayed condition is inputted.

In a case where the selected condition is displayed in white, or where the input of the numerical data is not required since the selected condition is already displayed in white (negative acknowledgement in the step 146), the end key ("0") described above is depressed by the user (positive acknowledgement in the step 134).

In either of those cases described above, the position calculation is carried out under the selected condition in the step 112 in the same way as the case where the start key ("W") is not depressed (negative acknowledgement in the step 130).

In the second preferred embodiment, since upon the operation for the key "W" all of the stored calculation conditions are displayed when the position to be calculated is specified, the user can arbitrarily select the optimum condition to calculate the specified position.

Therefore, the range of selection for position calculation conditions is widened so that the position calculation (step 112) can be carried out under the optimum condition. Consequently, a favorable position can be calculated with a degree of change in layout remarkably reduced and an effective utilization of the data base can be achieved.

Since in the second preferred embodiment only the data on the rule which is not possible to apply to the position calculation is displayed in red, the system user can easily identify the impossible rule data. Therefore, the system operatibity can be improved.

Furthermore, since in the second preferred embodiment the condition which is not possible to apply to the position calculation can be changed to that possible to apply thereto through the input of numerical data, the range of selection of condition applicable to the position calculation can easily be extended.

THIRD PREFERRED EMBODIMENT

Figure 20:
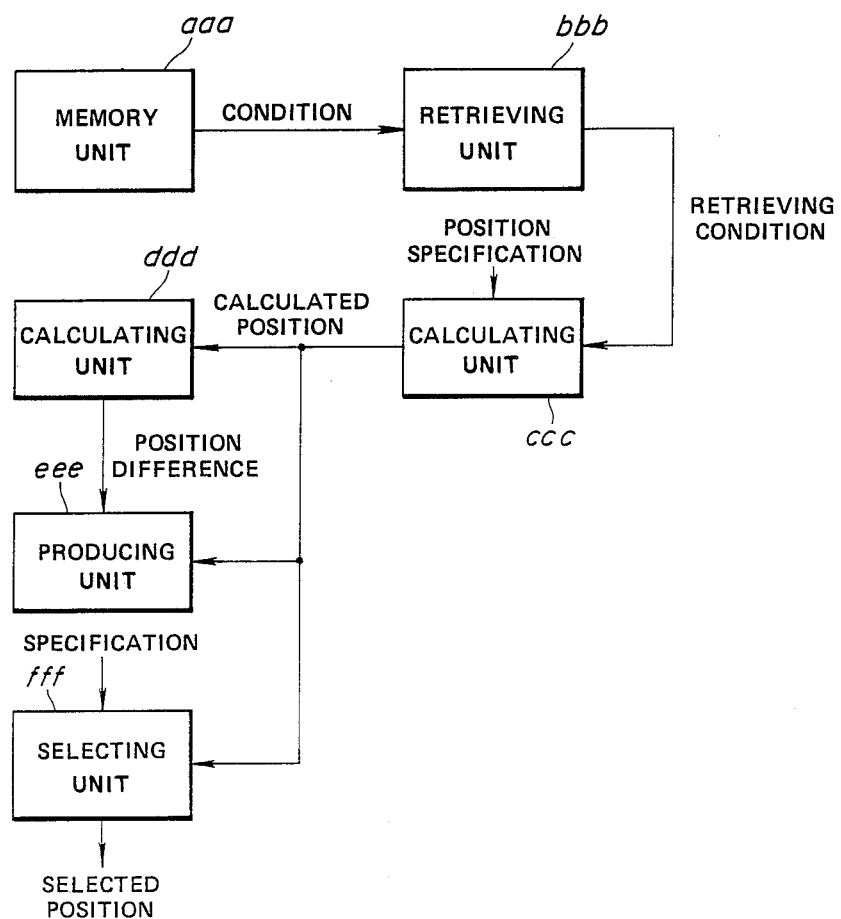
FIG. 20 is a functional block diagram of the layout backing up system in a third preferred embodiment.

FIG. 20 shows a general concept of the assembly parts layout backing up system in a third preferred embodiment.

Memory unit denoted by aaa stores a plurality of position calculation conditions on each position to be calculated of predetermined components (assembly parts) of the vehicle body.

Retrieving unit denoted by bbb retrieves all of the position calculation conditions for the specified position to be calculated in which necessary data have completely been generated from the contents of memory unit aaa. Calculating unit denoted by ccc sequentially derives the specified position under each retrieved calculation condition.

Furthermore, a position difference between each calculated position and another position having the relationship in the arrangement of the assembly parts to the calculated position is calculated by means of calculating unit denoted by ddd. Producing unit denoted by eee produces all of the calculated positions and positions are produced to the system user.

When the calculated position in which the optimum position difference is calculated from the produced contents of the producing unit eee is confirmed by the system user, the calculated position is selected through the selecting unit fff in accordance with an instruction from the system user.

In the third preferred embodiment, the specified position and position difference are calculated under all position calculation conditions in which all necessary data have completely been prepared. All of the calculation positions and position differences are produced to the system user. Then, the calculation position by which the optimum position difference is calculated is selected in accordance with an instruction from the system user.

The circuit block diagram of the third preferred embodiment is the same as that in the first preferred embodiment shown in FIG. 8.

Figure 22A:
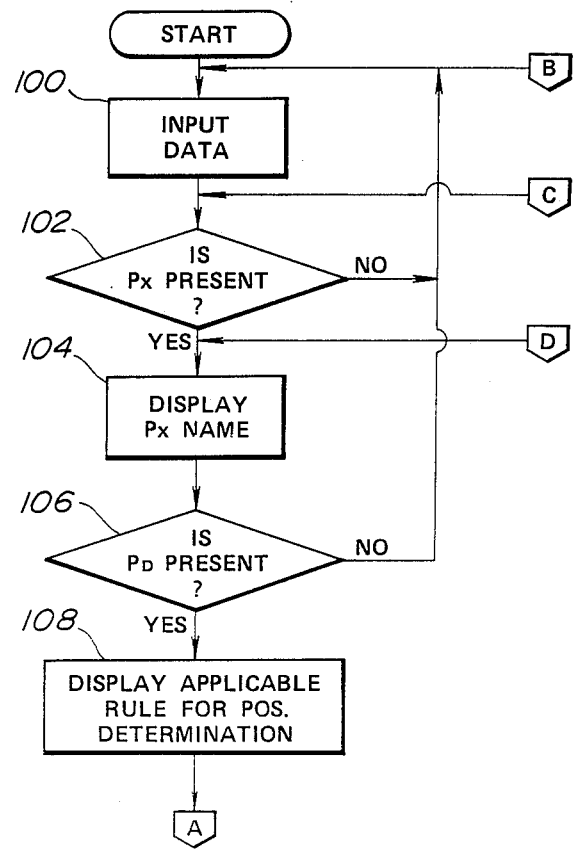
FIGS. 22(A) and 22(B) are integrally a processing flowchart for explaining the operation of the layout supporting system in the third preferred embodiment.
Figure 22:
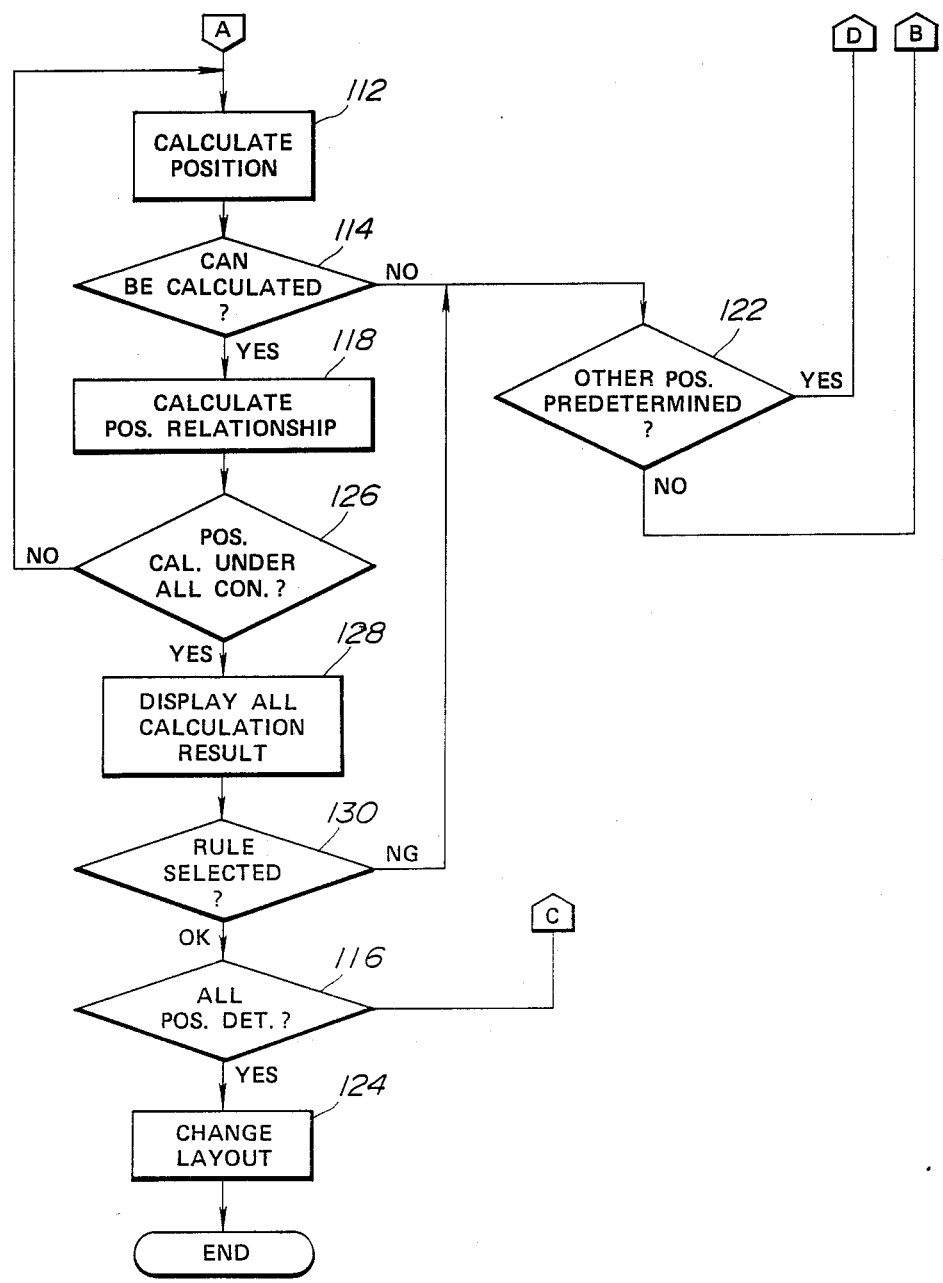

FIGS. 22(A) and 22(B) show integrally a processing flowchart executed in the third preferred embodiment.

FIG. 21 shows an example of conditions (rules) applicable to the position calculation.

When in the step 108 all of the conditions applicable to the position calculation are displayed on the screen of the CRT 16, the CPU 10 calculates the position under any of the displayed applicable conditions in a step 112.

Upon completion of the calculation (positive acknowledgement in the step 114), e.g., the step (height) difference between the clutch and brake pedals is calculated in the step 118.

Upon confirmation that the position calculation is not carried out under all applicable conditions (negative acknowledgement in the step 126), all results of calculations are displayed on the CRT 16 together with their corresponding applicable conditions, as shown in FIG. 23 in a table form, in a step 128.

At this time, since any numerical value deviated from the allowable range previously set according to a request of the system user or from the human engineering point of view (30, 180, 262, 30 in FIG. 23) is displayed in different colors, the most favorable condition (for example, Rule 1 or Rule 5) is easily confirmed.

Consequently, when any optimum condition is selected and the position derived under the optimum condition is specified in a step 130 (OK), the CPU 10 determines whether the position calculations are completed for all positions in a step 116. Upon confirmation of the completion of the position calculations for all positions, the processing of layout change is carried out in the step 124.

In the third preferred embodiment, the position calculation is carried out under all applicable calculation conditions, all of the position and position difference both derived under each condition are correspondingly displayed and any position is arbitrarily selected. A calculation position which is favorable from the human engineering point of view or which meets the request by the user can be selected. Therefore, without a remarkable change in layout, the optimum layout can effectively be carried out in a short time.

In addition, the user can easily select the optimum position since the calculation positions are classified and displayed in different colors.

FOURTH PREFERRED EMBODIMENT

Figure 24:
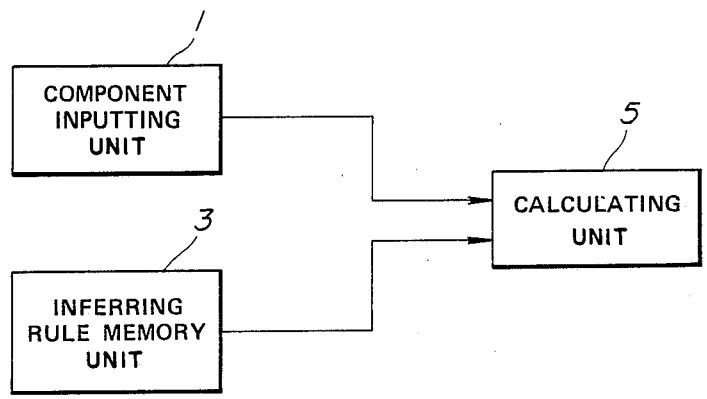
FIG. 24 is a functional block diagram for explaining a general concept of a fourth preferred embodiment.

FIG. 24 shows a general concept of the layout supporting system in a fourth preferred embodiment.

In the fourth preferred embodiment, the system includes: (a) inference rule memory unit 3 which records inference rules for inferring the layout within a set region from a temporarily laid out state of each of a plurality of components (assembly parts) on the basis of various layout requirements on a relative position relationship to another component; (b) component data input unit 1 for receiving components to architect the temporary layout and set conditions of the components; and (c) calculating unit 5 for calculating the architect of the temporary layout for each assembly part derived from the assembly part data input unit 1 from the inference rules from the inference rule memory unit 3 and set conditions on the corresponding assembly part.

Figure 25:
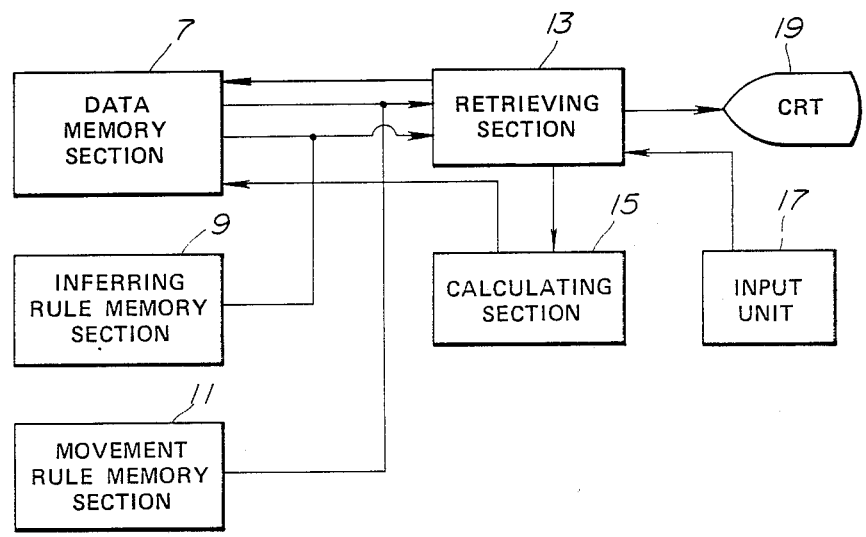
FIG. 25 is a specific circuit block diagram of the fourth preferred embodiment.

FIG. 25 shows a circuit block diagram of the layout supporting system in the fourth preferred embodiment.

In the fourth preferred embodiment shown in FIG. 25, the CRT denoted by 19 includes, e.g., a graphic screen on three-dimensional coordinates having a screen region constituted by dots (pixels). The CRT 19 displays the layout on a vehicle and various messages thereon on the screen region. The input unit denoted by 17 includes, e.g., a keyboard through which the system user inputs a coordinate point name of any of the vehicle assembly parts, coordinate values, distance and angle indicating the layout requirement between the coordinate points, and so on to a retrieving section 13.

A data memory section 7 stores data described above, i.e., the coordinate point name of the component inputted by the system user, coordinate value, distance, and angle indicating the layout requirements between the coordinate points. The stored data are shown in FIG. 26.

Figure 26:
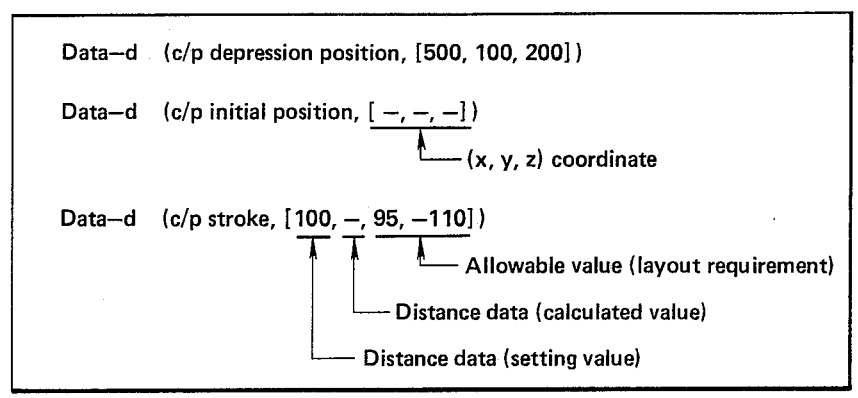
FIG. 26 is an explanatory view of an example of data contents in a data memory section 7 shown in FIG. 25.

It is noted that numerical values on a depression position in FIG. 26 are input values of the three-dimensional coordinate, c/p stroke in FIG. 26 indicates the distance data and in the c/p stroke portion, an input value from the system user, a calculated value (c/p lever length) in the calculating section 15 to be described later, and a value representing an allowable value which can be used to calculate the input value inputted from the user are stored. In addition, a c/p initial value indicates a reference coordinate value of the temporary coordinate value of each assembly part.

Inferring rule memory section 9 stores rules defining the layout requirements between the coordinate points of the respective components (assembly parts) in distance and angle and rules determining the temporary layout using the layout requirement defining rules.

Figure 27:
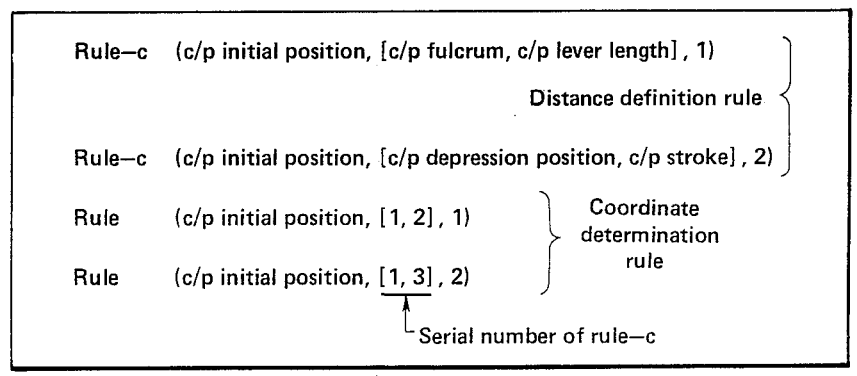
FIGS. 27(A) and 27(B) are explanatory views of examples of inferring rules of a temporary layout.
Figure 27:
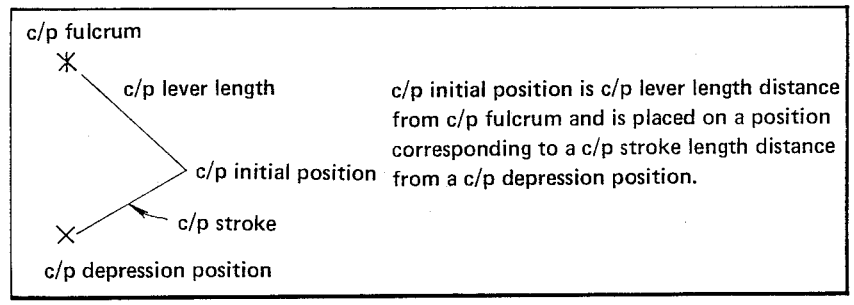

In detail, each Rule-c shown in FIG. 27(A) is a rule defining the layout requirement in the distance. A portion of each Rule-c stores a c/p fulcrum previously set as a reference value, a c/p lever length calculated as a distance from the c/p fulcrum, a c/p depression position inputted by the system user, and a c/p stroke length which is a value inputted by the user on a distance data from the c/p depression position for each component.

In addition, each Rule shown in FIG. 27(A) is a coordinate determining rule determining a coordinate value of each component using the above-described distance defining rule.

FIG. 27(B) shows an example of the coordinate determining rule.

As shown in FIG. 27(B), the details of the coordinate determining rule determines a c/p initial position of an intersection between a curve traced with the c/p fulcrum of the distance defining rule as a center and having a length corresponding to the c/p lever length and a curve traced with the c/p depression position as a center and having a length corresponding to the c/p stroke length. The c/p initial position is determined as the coordinate of the component (assembly part).

Figure 6:
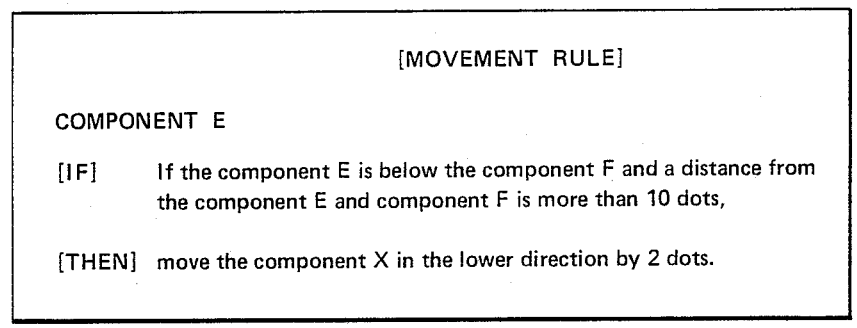
FIG. 6 is an explanatory view of the contents of a memory C 25 shown in FIG. 5 representing a movement rule.

The movement rule memory section 11 stores each movement rule as shown in FIG. 6. The movement rule is used to move the component in a direction suitable for the layout requirement after the end of the temporary layout of each component.

The retrieving section 13 stores the coordinate point name of each component inputted by the user through the input unit 17 into the data memory section 7 and retrieves the distance defining rule (Rule-c) and coordinate determining rule (Rule) applied to determine the temporary layout from the inferring rule memory section 9.

The retrieving section 13 retrieves whether the distance data inputted by the system user is possible to be calculated. If it is possible to be calculated, the retrieving section 13 outputs a command signal to the calculating section 15 to retrieve whether the calculated distance data to which the rules have been applied satisfy the layout requirement and displays the state of temporary layout on the CRT 19.

The calculating section 15 carries out calculations of the distance data of one of the components and coordinate values of the coordinate determining rule (Rule) upon receipt of the command signal from the retrieving section 13 and stores their calculation results in the data memory section 7.

Figure 28:
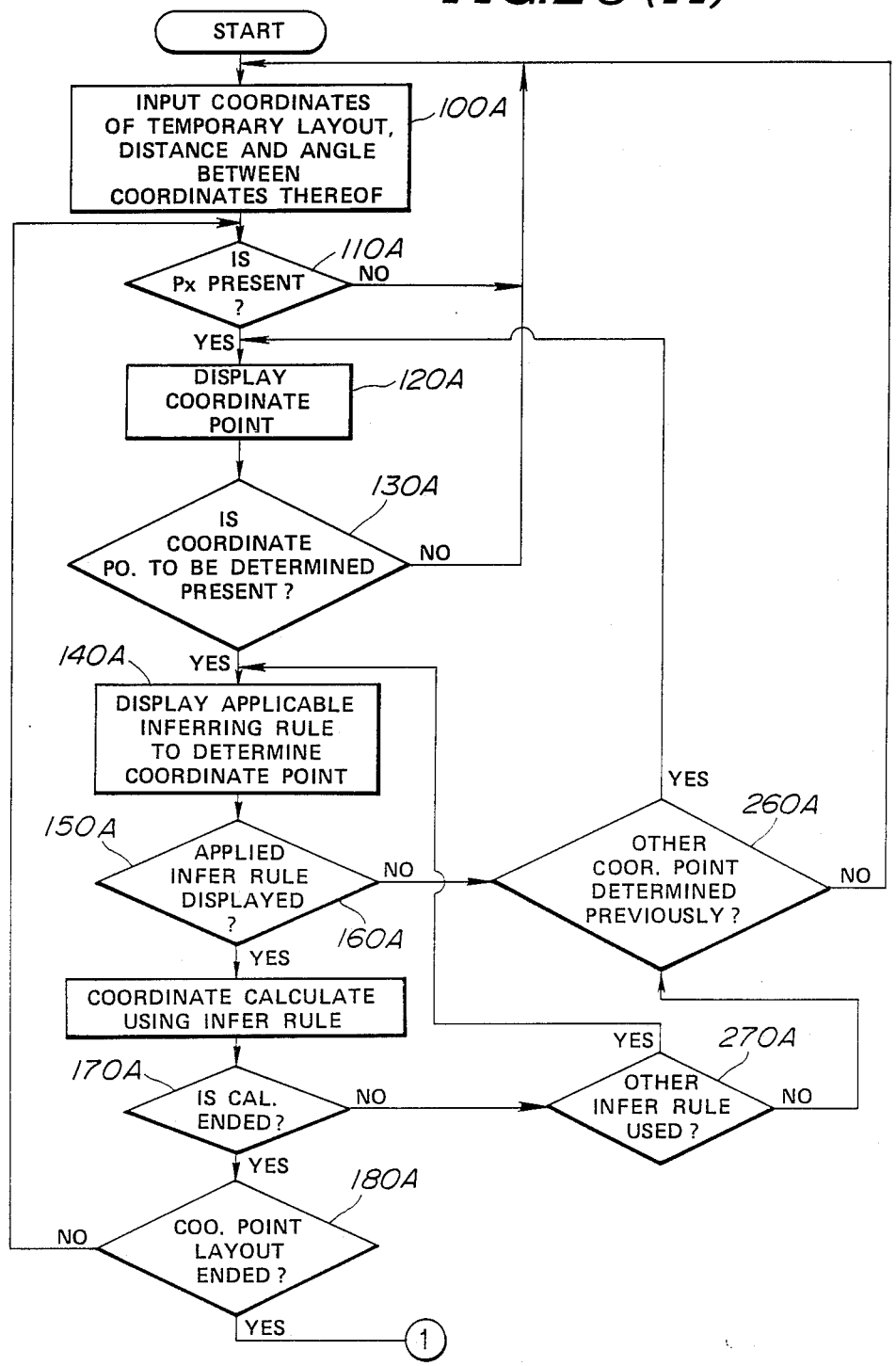
FIGS. 28(A) and 28(B) are integrally a processing flowchart for explaining the operation of the fourth preferred embodiment.
Figure 28:
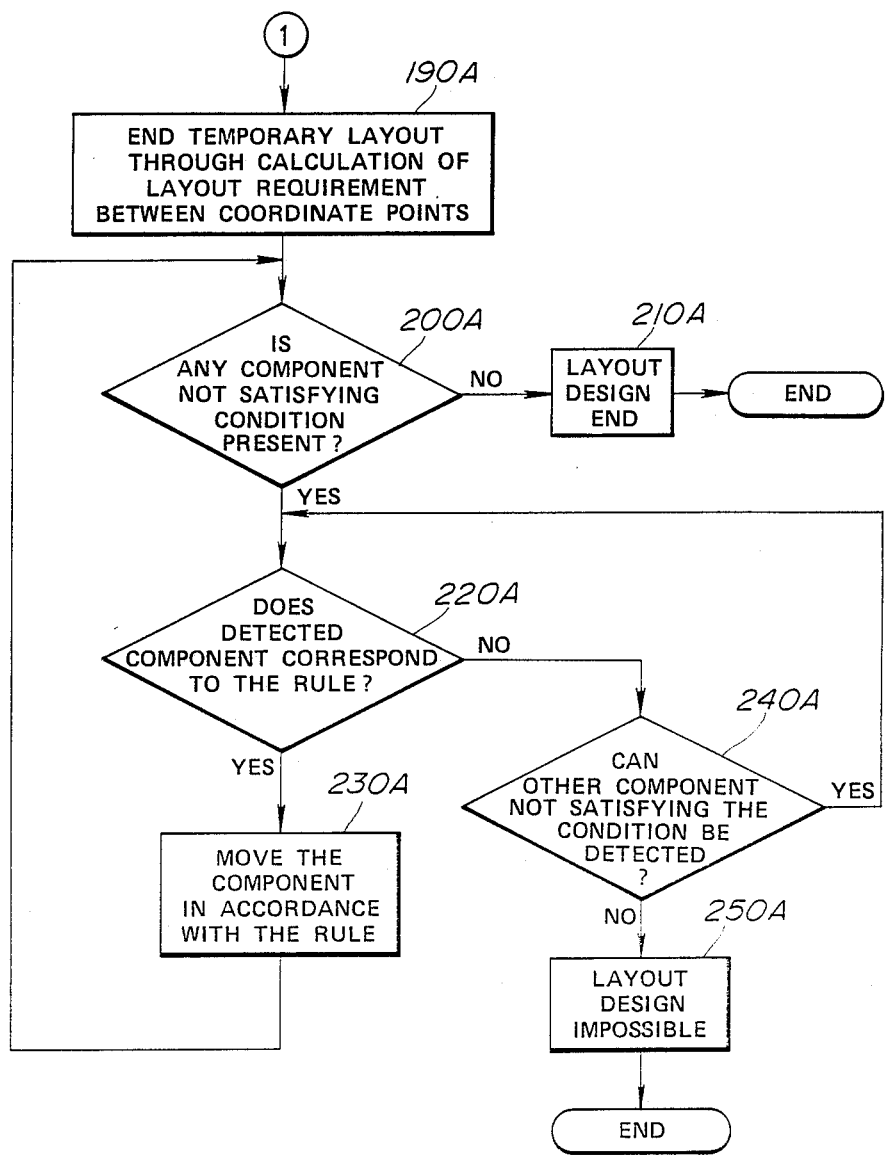

Next, the operation of the fourth preferred embodiment will be described below with reference to FIGS. 28(A) and 28(B).

Various messages on, e.g., the layout of the vehicle, are displayed on the CRT 19 comprising the graphic screen. The user, at this time, selects a part of the vehicle layout, e.g., in the vicinity of the driver's seat, depresses a corresponding key of the input unit 17 (keyboard) to input the coordinate point names required for the temporary layout such as those of a driver's eyepoint, roof, steering wheel, and accelerator pedal, and inputs data of the distance and angle representing the layout requirement between the coordinate points and coordinate values of the coordinate points of the corresponding assembly parts (step 100A).

Upon completion of the above-described inputs by the system user through the input unit 17, the retrieving section 13 stores the data such as the inputted distance data into the data memory section 7, retrieves whether the data are possible to be calculated on the basis of the corresponding allowable limit values. If possible to be calculated, the retrieving section 13 displays the coordinate point value of the corresponding component (assembly part) on the CRT 19 in a step 120A and the routine goes to a step 130A. If not possible to be calculated, the routine returns to the step 100A to input again the above-described data (steps 110A to 130A).

In the step 130A, the user determines whether the coordinate point displayed on the CRT 19 should be adopted to the layout. If yes (the displayed coordinate point name should be adopted) in the step 130A, the user depresses the corresponding key and the routine goes to a step 140A. If no (the displayed coordinate point is not adopted) in the step 130A, the user depresses the corresponding key (does not depress any key or depresses no key) and the routine returns to the step 100A.

In the step 140A, the retrieving section 13 displays one or more coordinate determining rules applicable to determine the coordinate value of the coordinate point and derived from the inferring rule memory section 9 through the CRT 19. In a step 150A, the user depresses a corresponding key of the input unit 17 if an applicable rule is present from among the displayed coordinate determining rules (Rules) and the routine goes to a step 160A. If no applicable rule is present in the step 150A, the user depresses its corresponding key of the input unit 17 and the routine goes to a step 260A.

In the step 260A, such a messages as "Do you determine another coordinate point previously?" in English, Japanese, or another language is displayed on the CRT 19. If the user determines the previous determination of the other coordinate point in the step 260A, the user depresses its corresponding key and the routine returns to the step 120A. If the user does not determine for the time being that of the other coordinate point, the routine returns to the step 100A.

On the other hand, in a step 160A, the retrieving section 13 outputs the command signal to the calculating section 15. The calculating section 15 then calculates the c/p initial position of the determined coordinate point using the selected coordinate determining rule. Upon completion of the calculation by the calculating section 15, the routine goes from a step 170A to a step 180A. However, if the calculation result indicates an imaginary part, the routine goes from the step 170A to a step 270A. In the step 170A, the user determines whether the calculation described above should be carried out using another coordinate determining rule (Rule) and the routine goes to the step 140A if the calculation needs to be carried out using the other rule. If not, the routine goes to the step 260A to select a new coordinate point.

In the step 180A, the retrieving section 13 determines whether the arrangement of the coordinate point to carry out the layout is ended. If not ended (no) in the step 180A, the routine returns to the step 110A and the retrieving section 13 retrieves the other coordinate point which is possible to be calculated. If the coordinate point arrangement is ended (yes) in the step 180A, the routine goes to a step 190A.

In the step 190A, the calculating section 15 carries out the calculations of distance and angle representing the layout requirement between the arranged coordinate points and the temporary layout in the vicinity of the driver's seat is displayed on the CRT 19 upon completion of the temporary layout.

When the temporary layout in the vicinity of the driver's seat is displayed on the CRT 19 in the step 190A, the user determines through the CRT 19 whether all assembly parts of the temporary layout satisfy the layout requirement. If they satisfy the layout requirement, the routine goes to a step 210A in which the layout is ended. If, for example, the eyepoint coordinate from among all components of the temporary layout is different from the layout requirement, the user depresses a corresponding key on the eyepoint of the input unit 17 through which the coordinate positional movement of the eyepoint is carried out.

In a step 220A, the retrieving section 13 retrieves a movement rule for moving the coordinate of the eyepoint which is different from the above-described layout requirement from the movement rule memory section 11. If the movement rule is not present in the step 220A, the routine goes to a step 240A. If the movement rule is present in the step 220A, the routine goes to a step 230A.

In the step 230A, the calculating section 15 carries out the calculation of the movement processing on the basis of the movement rule to move the corresponding component and the routine goes to the step 200A.

On the other hand, in the step 240A, the retrieving section 13 determines whether the component, e.g., the eyepoint satisfies the layout requirement with respect to, e.g., the steering wheel other than the roof. If the component satisfies the layout requirement with respect to the other component (yes) in the step 240A, the routine goes to the step 220A to detect the corresponding movement rule. If the component does not satisfy the layout requirement with respect to the other component (no) in the step 240A, the layout becomes impossible and is ended in a step 250A. In the way described above, since the temporary layout is carried out on the basis of the inferring rule suitable for the assembly part inputted by the user through the input unit, such a troublesome operation from the temporary layout to the completion of the layout can be reduced.

It will fully be understood by those skilled in the art that the foregoing description has been made in terms of the preferred embodiments and various changes and modifications may be made without departing from the scope of the present invention which is to be defined by the appended claims.

What is claimed is:

1. A system for supporting layout of assembly parts for a product, comprising:
   (a) first means for specifying any one of a plurality of positions of assembly parts to be derived, the specified positions defining a layout position of each assembly part;
   (b) second means for deriving the specified position of individual assembly parts on the layout on the basis of a basic data relating to the layout in accordance with at least one set condition and deriving a data based on a positional requirement of another specified position of one of the other assembly parts under the set condition;
   (c) third means for determining whether the data based on the positional requirements is within an allowable range;
   (d) fourth means for receiving the result of determination in the third means and for requiring a system user to select or discard the layout position of the specified position of a corresponding assembly part until all positions of the assembly parts are specified and derived by the first and second means and selected by the user through the fourth means; and
   (e) fifth means for changing the layout position of the corresponding assembly part which is deviated from the allowable range when all positions of the assembly parts are specified and derived by the first and second means and selected by the user through the fourth means.

2. The system according to the claim 1, which further comprises:
   (f) sixth means for displaying a plurality of the set conditions under which the specified position of the assembly part is derived by the second means; and
   (g) seventh means for selecting any one of the plurality of the set conditions displayed by the sixth means which is applicable to the deviation of the specified position of the assembly part in accordance with an instruction of the user.

3. The system according to the claim 2, which further comprises eighth means for correcting a corresponding one of the set conditions when the seventh means selects the set condition which is not applicable to the derivation of the specified position of the assembly part in accordance with the instruction by the user so that the corrected set condition becomes applicable thereto.

4. The system according to claim 3, wherein the sixth means displays the plurality of the set conditions among which any one of the set conditions which is not applicable to the derivation of the specified position of the assembly part is simultaneously displayed in a different color from the other set conditions.

5. The system according to claim 1, which further comprises:
   (f) sixth means for storing a plurality of set conditions under which the specified position of the assembly part is derived; and
   (g) seventh means for retrieving all set conditions in which all necessary data are prepared from stored contents of the sixth means, and wherein the second means derives the specified position of the assembly part under each set condition retrieved by the seventh means and derives the data based on the positional requirement to the other assembly part under each set condition retrieved by the seventh means.

6. The system according to claim 5, which further comprises eighth means for displaying the derived positions of the specified position of the assembly part and derived data based on the positional requirement of the other assembly part under all set conditions by the second means and selecting one of the derived positions of the specified position of the assembly part and one of the derived data in accordance with the instruction of the user.

7. The system according to claim 1, wherein the data based on the positional requirement of the other assembly part corresponds to a difference in positions of both elements.

8. The system according to claim 1, wherein the allowable range is predetermined from a human engineering point of view.

9. The system according to claim 1, wherein the allowable range is predetermined according to a request from the system user.

10. The system according to claim 1, wherein the allowable range has allowable maximum and minimum values and wherein the fourth means displays the result of determination in different colors so as to identify the result of determination depending on whether the result of determination in the third means indicates that the data exceeds the maximum value, falls within the allowable range, or is below the minimum value.

11. The system according to claim 10, wherein the system user selects the result of determination according to the displayed contents in different colors so that no change in the layout position which exceeds a predetermined limit by the fifth means occurs.

12. The system according to claim 10, wherein the fourth means displays the result of the determination in red when the data exceeds the maximum value, in white when the data falls within the allowable range, and in yellow when the data is below the minimum value.

13. The system according to claim 1, which further comprises sixth means for displaying the layout of the corresponding assembly part whose positions are derived after the processing of the fifth means in a table representation on an image screen.

14. The system according to claim 1, which further comprises sixth means for displaying the layout and the corresponding assembly part whose positions are derived after the processing of the fifth means in a graphical representation on an image screen.

15. A system for supporting layout of assembly parts for a product, comprising:
(a) first means for inputting in accordance with an instruction by a system under coordinate point names of assembly parts required for a temporary layout of the assembly parts, first data representing coordinate values of the respective assembly parts, and second data representing a layout requirement between the coordinate points;
(b) second means for determining whether the second data is a data under which a position of each assembly part can be calculated with respect to an allowable range and displaying the coordinate point when determining that a position calculation is possible under the second data so as to determine an adoption of the coordinate point to the layout by the system user;
(c) third means for retrieving and displaying one or more set conditions applicable to determination of a coordinate value to the corresponding coordinate point;
(d) fourth means for calculating a distance and/or angle representing the layout requirement between the calculated coordinate points to complete a temporary layout of the product; and
(f) sixth means for determining whether all assembly parts in a state of the temporary layout satisfy individual layout requirements with respect to relative positions of the assembly parts.

16. The system according to claim 15, which further comprises:
(g) seventh means for ending the layout when the sixth means determines that all assembly parts satisfy the individual layout requirements; and
(h) eighth means for detecting any one of the assembly parts which does not satisfy the layout requirement and moving the detected assembly part so as to satisfy the layout requirement.

17. A system for supporting layout of components for a part of a vehicle, comprising:
(a) first means for sequentially specifying any one of a plurality of coordinate positions of components to be calculated, the specified positions defining a layout position of each component on the part of the vehicle;
(b) second means for deriving the specified position of the component for the layout on the basis of a variable on the layout of the part of the vehicle under at least one set condition for the layout and deriving a positional data on a positional relationship to another component of any one of other components under the set condition;
(c) third means for determining whether the positional data is within an allowable range;
(d) fourth means for displaying the result of determination in the third means and selecting or discarding the layout position of the specified position of the component in accordance with an instruction by a system user until all positions of each component are specified and derived by the user through the fourth means; and
(e) fifth means for changing the layout position of the corresponding position which is deviated from the allowable range and is selected by the user when all positions of the components are specified and derived by the first and second means and selected by the user through the fourth means.

18. A method for supporting layout of components for a product, the method comprising the steps of:
(a) specifying any one of a plurality of component positions to be derived, the specified positions defining a layout position of each component;
(b) deriving the specified position of individual components on the layout on the basis of a basic layout data under at least one set condition;
(c) deriving a position data based on a positional relationship to another component under the set condition;
(d) determining whether a value of the position data falls within an allowable range;
(e) displaying the result of determination in the step (d) for selecting or discarding the layout position of the specified position of the component in accordance with an instruction by a system user; and
(f) repeating the steps of (a) to (e) until all specified positions of the components are derived and the position data values fall within the allowable range.

19. The method according to claim 18, which further comprises the step of (g) changing the position of the component when its positional data with respect to to the other component is deviated from the allowable range but selected in accordance with the instruction by the user so that the positional data falls within the allowable range.

* * * * *